United States Patent
Lai et al.

(10) Patent No.: US 12,307,183 B2
(45) Date of Patent: May 20, 2025

(54) VARIABLE WIDTH NANO-SHEET FIELD-EFFECT TRANSISTOR CELL STRUCTURE

(71) Applicant: Taiwan Semiconductor Manufacturing Company Limited, Hsinchu (TW)

(72) Inventors: Wei-An Lai, Taichung (TW); Wei-Cheng Lin, Taichung (TW); Yan-Hao Chen, Hsinchu (TW); Jiann-Tyng Tzeng, Hsinchu (TW); Lipen Yuan, Zhubei (TW); Hui-Zhong Zhuang, Kaohsiung (TW); Yu-Xuan Huang, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 263 days.

(21) Appl. No.: 17/872,859

(22) Filed: Jul. 25, 2022

(65) Prior Publication Data
US 2022/0358275 A1     Nov. 10, 2022

Related U.S. Application Data

(62) Division of application No. 17/199,551, filed on Mar. 12, 2021, now Pat. No. 11,429,774.

(51) Int. Cl.
G06F 30/392     (2020.01)
B82Y 40/00      (2011.01)
H10D 89/10      (2025.01)
G06F 111/14     (2020.01)

(52) U.S. Cl.
CPC ........... *G06F 30/392* (2020.01); *H10D 89/10* (2025.01); *B82Y 40/00* (2013.01); *G06F 2111/14* (2020.01)

(58) Field of Classification Search
None
See application file for complete search history.

(56) References Cited

U.S. PATENT DOCUMENTS

| | | | |
|---|---|---|---|
| 10,096,608 B2 | 10/2018 | Morimoto et al. | |
| 10,424,639 B1* | 9/2019 | Miao | H01L 21/0228 |
| 10,734,523 B2* | 8/2020 | Lie | H01L 21/76232 |
| 11,282,829 B2* | 3/2022 | Sio | G06F 30/39 |
| 11,861,282 B2* | 1/2024 | Huang | H01L 21/823821 |
| 2020/0357786 A1 | 11/2020 | Sio et al. | |
| 2021/0066291 A1* | 3/2021 | Lin | H01L 29/42384 |
| 2021/0202465 A1 | 7/2021 | Wang et al. | |
| 2021/0240902 A1 | 8/2021 | Ku et al. | |
| 2021/0271797 A1 | 9/2021 | Lai et al. | |
| 2022/0278195 A1* | 9/2022 | Ando | H01L 29/401 |

* cited by examiner

*Primary Examiner* — Leigh M Garbowski
(74) *Attorney, Agent, or Firm* — FOLEY & LARDNER LLP

(57) ABSTRACT

One aspect of this description relates to a method for operating an integrated circuit (IC) manufacturing system. The method includes placing a first nano-sheet structure within a IC layout diagram. The first nano-sheet structure has a first width. The method includes abutting a second nano-sheet structure with the first nano-sheet structure. The second nano-sheet structure has a second width. The second width is less than the first width. The method includes generating and storing the IC layout diagram in a storage device.

19 Claims, 25 Drawing Sheets

100 ⟶

```
┌─────────────────────────────────────────────────────────────┐
│ Place a first nano-sheet structure within a IC layout diagram, │ ⟵ 110
│   the first nano-sheet structure having a first width.      │
└─────────────────────────────────────────────────────────────┘
                              │
                              ▼
┌─────────────────────────────────────────────────────────────┐
│ Abut a second nano-sheet structure with the first nano-sheet │
│ structure, the second nano-sheet structure having a second   │ ⟵ 120
│ width, the second width being less than the first width.     │
└─────────────────────────────────────────────────────────────┘
                              │
                              ▼
┌─────────────────────────────────────────────────────────────┐
│ Generate and store the IC layout diagram in a storage device. │ ⟵ 130
└─────────────────────────────────────────────────────────────┘
                              │
                              ▼
┌─────────────────────────────────────────────────────────────┐
│ Fabricate a semiconductor mask or component based on the     │ ⟵ 140
│                    IC layout diagram.                        │
└─────────────────────────────────────────────────────────────┘
                              │
                              ▼
┌─────────────────────────────────────────────────────────────┐
│ Perform one or more manufacturing operations based on the    │ ⟵ 150
│                    IC layout diagram.                        │
└─────────────────────────────────────────────────────────────┘
```

┌─────────────────────────────────────────────────────────┐
│ Arrange a first cell as a first nano-sheet structure and a second │
│ nano-sheet structure, the first nano-sheet structure having a first │
│ width, the second nano-sheet structure having a second width, the │ — 510
│ second nano-sheet structure separated from the first nano-sheet │
│ structure by a first distance along the second direction. │
└─────────────────────────────────────────────────────────┘
↓
┌─────────────────────────────────────────────────────────┐
│ Arrange a second cell as a third nano-sheet structure and a fourth │
│ nano-sheet structure, the third nano-sheet structure having a third │
│ width, the fourth nano-sheet structure having a fourth width, the │
│ fourth nano-sheet structure separated from the third nano-sheet │ — 520
│ structure by a second distance, the third width being less than the │
│ first width and the fourth width being less than the second width. │
└─────────────────────────────────────────────────────────┘
↓
┌─────────────────────────────────────────────────────────┐
│ Align the second cell with the first cell such that the third │
│ nano-sheet structure abuts with the first nano-sheet structure and │ — 530
│ the fourth nano-sheet structure abuts with the second nano-sheet │
│ structure. │
└─────────────────────────────────────────────────────────┘
↓
┌─────────────────────────────────────────────────────────┐
│ Generate and store the IC layout diagram in a storage device. │ — 130
└─────────────────────────────────────────────────────────┘
↓
┌─────────────────────────────────────────────────────────┐
│ Fabricate a semiconductor mask or component based on the IC │ — 140
│ layout diagram. │
└─────────────────────────────────────────────────────────┘
↓
┌─────────────────────────────────────────────────────────┐
│ Perform one or more manufacturing operations based on the IC │ — 150
│ layout diagram. │
└─────────────────────────────────────────────────────────┘

FIG. 5

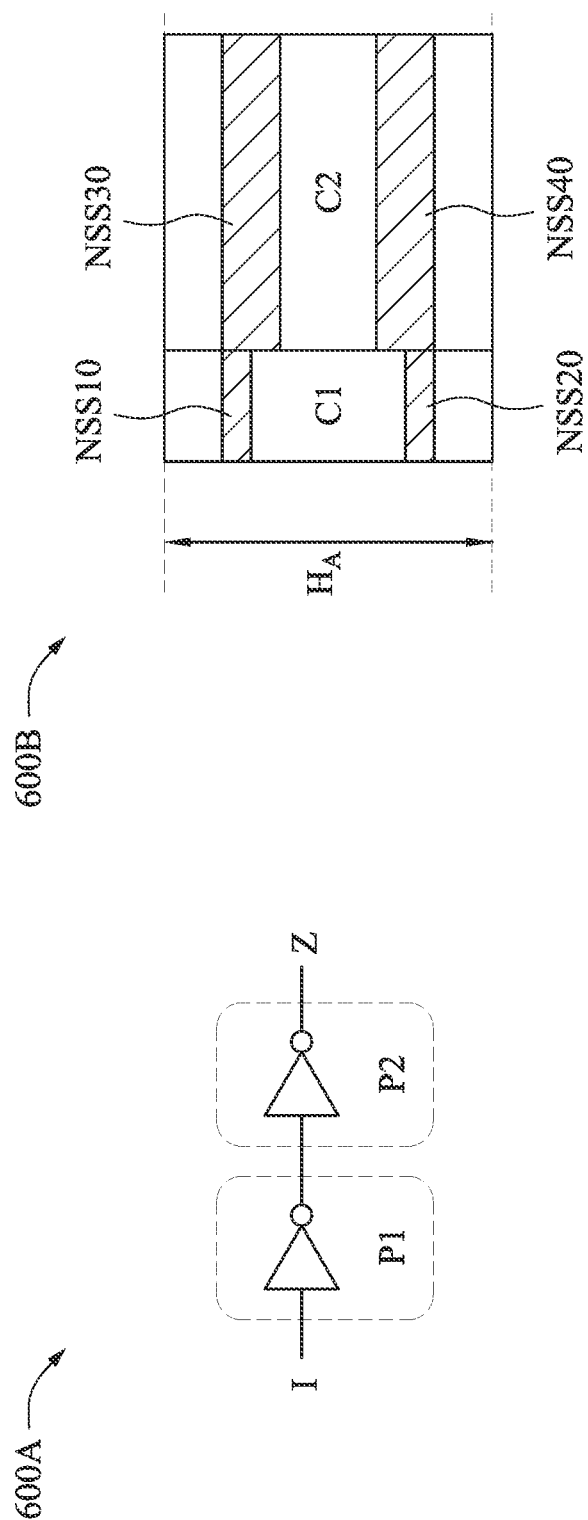

VARIABLE WIDTH NANO-SHEET FIELD-EFFECT TRANSISTOR CELL STRUCTURE

CROSS-REFERENCE TO RELATED APPLICATION

This application is related to and claims priority under 35 U.S. § 120 as a continuation of U.S. Utility application Ser. No. 17/199,551, filed Mar. 12, 2021, titled "VARIABLE WIDTH NANO-SHEET FIELD-EFFECT TRANSISTOR CELL STRUCTURE," the entire contents of which are incorporated herein by reference for all purposes.

BACKGROUND

An integrated circuit (IC) typically includes a number of semiconductor devices otherwise known as IC devices. One way to represent an IC device is with a plan view diagram referred to as a layout diagram, or IC layout diagram. An IC layout diagram is hierarchical and includes modules which carry out high-level functions in accordance with the IC device's design specifications. The modules are often built from a combination of cells that can include both standard and custom cells, each of which represents one or more semiconductor structures.

Cells are configured to provide common, low-level functions, often performed by transistors based on gate regions that intersect active regions. The elements of a cell are arranged within a cell boundary and electrically connected to other cells through interconnect structures.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 is a flowchart of a method of operating an IC manufacturing system, in accordance with some embodiments.

FIG. 5 is a flowchart of a method of operating an IC manufacturing system, in accordance with some embodiments.

FIG. 6A depicts a circuit diagram of a multi-stage buffer, in accordance with some embodiments.

FIG. 6B depicts an IC layout diagram, in accordance with some embodiments.

DETAILED DESCRIPTION

Figure 2:
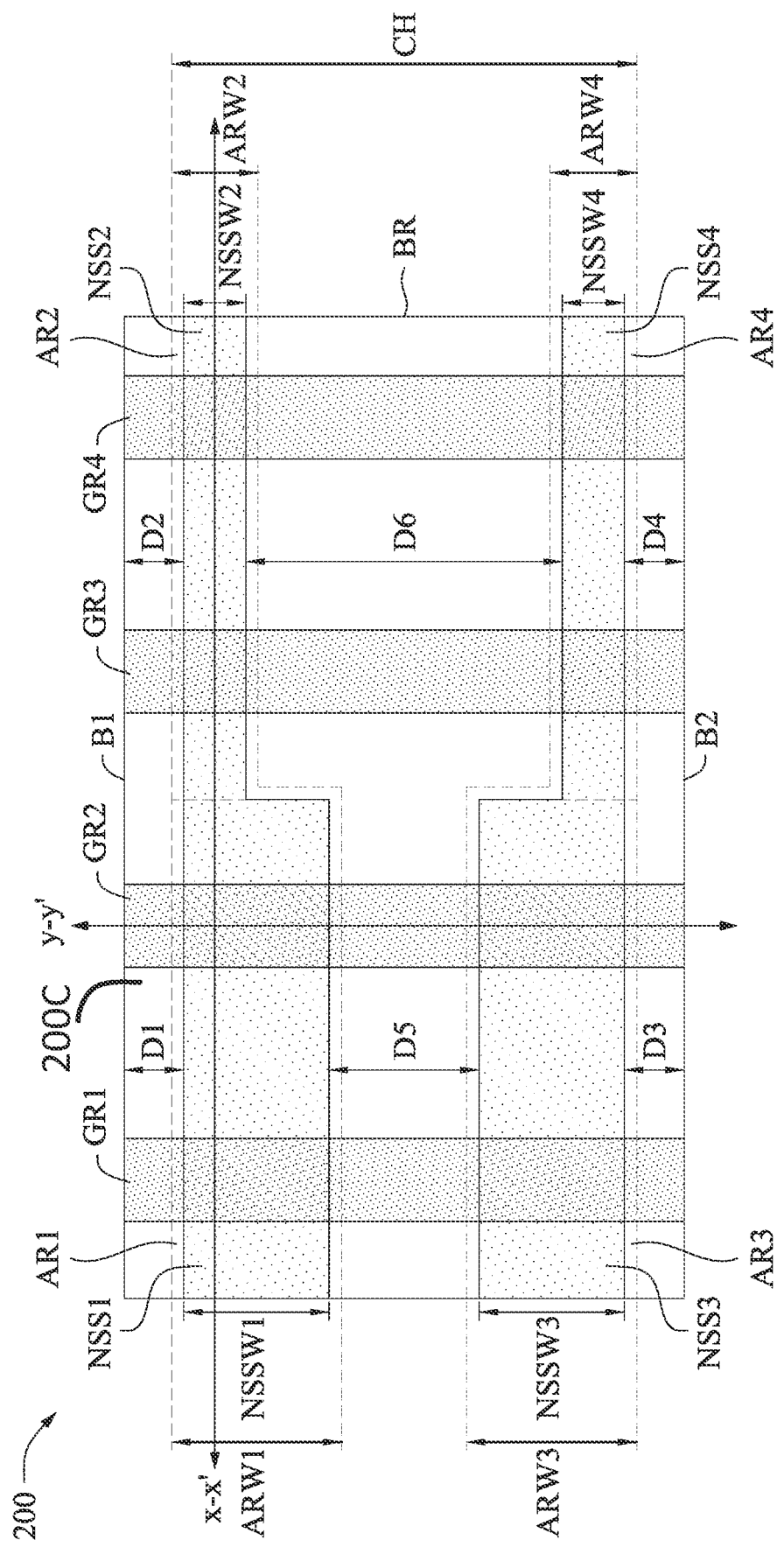
FIG. 2 depicts an IC layout diagram, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a method, system, and structure correspond to an IC layout diagram of a cell including nano-sheet fin field-effect transistors (FinFETs) having nano-sheet structures of different widths. A nano-sheet structure (e.g., a nano-sheet stack) is a type of fin that includes alternating layers of nano-sheet channel and gate regions such that the gate regions completely surround the channels. For a given cell height, including at least one nano-sheet FinFET having a wider nano-sheet structure than at least one other nano-sheet FinFET, wherein the wider nano-sheet structure is abutted to the narrower nano-sheet structure, optimizes driving ability, speed, power, and area of the associated IC devices with finer granularity as compared to approaches in which each nano-sheet FinFET of a cell are constrained to having rows of nano-sheet structures, wherein the width of each row is constant.

FIG. 1 is a flowchart of a method 100 of operating an IC manufacturing system, in accordance with some embodiments. In some embodiments, operating the IC manufacturing system includes generating an IC layout diagram, e.g., an IC layout diagram 200 discussed below with respect to FIG. 2, corresponding to an IC structure manufactured based on the generated IC layout diagram as part of an IC device. Non-limiting examples of IC devices include memory circuits, logic devices, processing devices, signal processing circuits, or the like.

In some embodiments, some or all of method 100 is executed by a processor of a computer. In some embodiments, some or all of method 100 is executed by a processor 1202 of an IC layout diagram generation system 1200, discussed below with respect to FIG. 12.

Some or all of the operations of method 100 are capable of being performed as part of a design procedure performed in a design house, e.g., a design house 1320 discussed below with respect to FIG. 13.

In some embodiments, the operations of method 100 are performed in the order depicted in FIG. 1. In some embodiments, the operations of method 100 are performed simultaneously and/or in an order other than the order depicted in FIG. 1. In some embodiments, one or more operations are performed before, between, during, and/or after performing one or more operations of method 100.

FIG. 2 is a depiction of non-limiting example of an IC layout diagram 200 generated by executing one or more operations of method 100 as discussed below, in some embodiments. IC layout diagram 200 is simplified for the purpose of illustration. In various embodiments, one or more of IC layout diagram 200 includes features in addition to those depicted in FIG. 2, e.g., one or more transistor elements, power rails, isolation structures, wells, conductive elements, or the like.

FIG. 2 further depicts an X direction and a Y direction perpendicular to the X direction. The X direction being depicted as horizontal with respect to the page and the Y direction being depicted as vertical are a non-limiting example for the purpose of illustration. In various embodiments, the X and Y directions are perpendicular to each other and have orientations other than those depicted in FIG. 2. In some embodiments the X direction is a "first direction" and the Y direction is a "second direction." In other embodiments, the Y direction is the "first direction" and the X direction is the "second direction."

The X direction includes a positive X direction depicted in FIG. 2 and a negative X direction (not labeled) opposite to the positive X direction. The Y direction includes a positive Y direction depicted in FIG. 2 and a negative Y direction (not labeled) opposite to the positive Y direction.

At operation 110, a first nano-sheet structure, such as the nano-sheet structure NSS1 with respect to FIG. 2, is placed within a first active region of an IC layout diagram of a cell. The first nano-sheet structure extends in a first direction and has a width in a second direction (e.g., a cell height direction) perpendicular to the first direction. In some embodiments, placing the first nano-sheet structure within the first active region of the IC layout diagram of the cell includes placing the first nano-sheet structure in an existing IC layout diagram of the cell. In some embodiments, placing the first nano-sheet structure within a first active region of an IC layout diagram of a cell includes creating a new IC layout diagram of a cell and placing the first nano-sheet structure in the newly created IC layout diagram of the cell.

A cell has a cell height in the Y direction from a first border to a second border opposite the first border. In some embodiments, a cell includes a standard cell, a custom cell, an engineering change order (ECO) cell, a logic gate cell, a memory cell, or another type of cell or combination of cells capable of being defined in an IC layout diagram. In various embodiments, a logic gate cell includes one or more of an AND, OR, NAND, NOR, XOR, INV, AND-OR-Invert (AOI), OR-AND-Invert (OAI), MUX, flip-flop, BUFF, latch, delay, or clock device. In various embodiments, a memory cell includes one or more of a static random access memory (SRAM), a dynamic RAM (DRAM), a resistive RAM (RRAM), a magnetoresistive RAM (MRAM), or read only memory (ROM) cell, or another device capable of having multiple states representative of logical values.

A nano-sheet structure, e.g., one of the nano-sheet structures NSS1-NSS4, depicted in FIG. 2 is a raised, elongated portion extending in a first direction. The nano-sheet structure includes alternating layers of nano-sheet channel and gate region, both of which are described below.

An active region, e.g., one of the active regions AR1-AR4 discussed below with respect to FIG. 2, is a region in an IC layout diagram included in a manufacturing process as part of defining an active area, also referred to as an oxide diffusion or definition (OD) in some embodiments, in a semiconductor substrate.

An active area is a continuous section of the semiconductor substrate having either n-type or p-type doping that includes various semiconductor structures, including one or more nano-sheet structures of a FinFET in some embodiments. In various embodiments, an active area is located within a well, i.e., either an n-well or a p-well, within the semiconductor substrate and/or is electrically isolated from other elements in the semiconductor substrate by one or more isolation structures, e.g., one or more shallow trench isolation (STI) structures.

At operation 120, a second nano-sheet structure, such as the nano-sheet structure NSS2 with respect to FIG. 2, is abutted with the first nano-sheet structure along the second direction. The second nano-sheet structure extends in the first direction and has a second width in the second direction. The second nano-sheet structure is within a second active region. The second width is less than the first width.

FIG. 2 depicts IC layout diagram 200 of a cell 200C including a boundary BR, a cell height CH in the Y direction (e.g., cell height direction), active region AR1 including nano-sheet structure NSS1 extending in the X direction, and active region AR2 abutting with AR1 along the Y direction. The active region AR2 includes nano-sheet structure NSS2 extending in the X direction and abutting with NSS1 along the Y direction. In some embodiments, NSS1 and NSS2 form a continuous nano-sheet structure. In some embodiments, AR1 and AR2 form a continuous active region. In some embodiments, at least one of the continuous nano-sheet structure or the continuous active region extends across a row of one or more cells, in the X direction.

The IC layout diagram 200 of the cell 200C includes active region AR3 including nano-sheet structure NSS3 extending in the X direction, and active region AR4 abutting with AR3 along the Y direction. The active region AR4 includes nano-sheet structure NSS4 extending in the X direction and abutting with NSS3 along the Y direction. In some embodiments, NSS3 and NSS4 form a continuous nano-sheet structure. In some embodiments, AR3 and AR4 form a continuous active region. In some embodiments, at least one of the continuous nano-sheet structure or the continuous active region extends across a row of one or more cells, in the X direction.

The IC layout diagram 200 of the cell 200C includes gate regions GR1 and GR2 extending in the Y direction and intersecting each of active regions AR1 and AR3, thereby defining, at least in part, one or more transistors (not labeled) of cell 200C. The IC layout diagram 200 of the cell 200C includes gate regions GR3 and GR4 extending in the Y direction and intersecting each of active regions AR2 and AR4, thereby defining, at least in part, one or more transistors (not labeled) of cell 200C. In various embodiments, active regions AR1 and AR2 are a p-type active regions and active regions AR3 and AR4 are n-type active regions, or active regions AR1 and AR2 are n-type active regions and active regions AR3 and AR4 are p-type active regions. In various embodiments, cell 200C has a configuration, e.g., a logic gate, that includes one or more features, e.g., at least one of metal-like defined, via, or conductive regions, in addition to those depicted in FIG. 2 that are not shown for the purpose of illustration.

A gate region, e.g., one of gate regions GR1-GR4 depicted in FIG. 2 is a region in an IC layout diagram included in a manufacturing process as part of defining a gate structure overlying the semiconductor substrate. In the non-limiting example depicted in FIG. 2, gate regions GR1-GR4 have an orientation along the Y direction.

In some embodiments, a location at which a gate region intersects an active region in an IC layout diagram corresponds to a transistor in the corresponding IC structure that includes the portion of the corresponding gate structure overlying the corresponding active area, portions of the active area below and partially surrounded by the gate structure, and source drain (S/D) structures adjacent to the gate structure. In other embodiments, a gate region intersects an active region at a location that does not correspond to a transistor, and the corresponding gate structure is referred to as a dummy gate structure in some embodiments. In some embodiments, the gate region has a length in the first direction (e.g., the X direction) between 10 nm and 100 nm.

A gate structure is a volume including one or more conductive segments including one or more conductive materials, e.g., polysilicon, one or more metals, titanium (Ti), aluminum (Al), nitrogen (N), tantalum (Ta), tungsten (W), cobalt (Co), copper (Cu), ruthenimum (Ru), and/or one or more other suitable materials, substantially surrounded by one or more insulating materials, e.g., silicon dioxide and/or one or more other suitable materials, the one or more conductive segments thereby being configured to control a voltage provided to underlying and adjacent dielectric layers. In various embodiments, a dielectric layer includes one or more of silicon dioxide and/or a high-k dielectric material, e.g., a dielectric material having a k value higher than 3.8 or 7.0. In some embodiments, a high-k dielectric material includes lithium (Li), beryllium (Be), magnesium (Mg), calcium (Ca), strontium (Sr), scandium (Sc), yttrium (Y), zirconium (Zr), hafnium (Hf), aluminum (Al), lanthanum (La), cerium (Ce), praseodymium (Pr), neodymium (Nd), samarium (Sm), europium (Eu), gadolinium (Gd), terbium (Tb), dysprosium (Dy), holmium (Ho), Erbium (Er), Thulium (Tm), ytterbium (Yb), lutetium (Lu), aluminum oxide, hafnium oxide, lanthanum oxide, or another suitable material.

The active regions AR1-AR4 have respective widths ARW1-ARW4 in the Y direction. The nano-sheet structures NSS1-NSS4 have respective widths NSSW1-NSSW4 in the Y direction. In some embodiments, each active region (e.g., AR1) has a same width as the width of the nano-sheet structure (e.g., NSS1) within that active region. In some embodiments, each active region (e.g., AR1) has a width greater than the width of the nano-sheet structure (e.g., NSS1) within that active region.

In some embodiments, placing the first nano-sheet structure within the first active region includes positioning at least one of the nano-sheet structure NSS1 and the active region AR1 a distance D1 along the Y direction from a border segment B1 of boundary BR of cell 200C. In some embodiments, placing the second nano-sheet structure within the first active region includes positioning at least one of the nano-sheet structure NSS2 and the active region AR2 a distance D2 along the Y direction from a border segment B1 of boundary BR of cell 200C. In some embodiments, the distance D2 is equal to the distance D1.

In some embodiments, NSS3 is positioned a distance D3 along the Y direction from a border segment B2 of boundary BR of cell 200C. The border segment B2 is a border segment opposite B1. In some embodiments, NSS4 is positioned a distance D4 along the Y direction from the border segment B2 of boundary BR of cell 200C. In some embodiments, the distance D4 is equal to the distance D3. In some embodiments, D4 and D3 equal to D2 and D1, respectively. In some embodiments, at least one of the nano-sheet structure NSS1 and the active region AR1 is separated from at least one of the nano-sheet structure NSS3 and the active region AR3 by a distance D5 along the Y direction. In some embodiments, at least one of the nano-sheet structure NSS2 and the active region AR2 is separated from at least one of the nano-sheet structure NSS4 and the active region AR4 by a distance D6 along the Y direction. In some embodiments, the distance D6 is greater than the distance D5. In some embodiments, a sum of D1, NSSW1, D5, NSSW3, and D3 is equal to CH. In some embodiments, a sum of D2, NSSW2, D6, NSSW4, and D4 is equal to CH.

Figure 3:
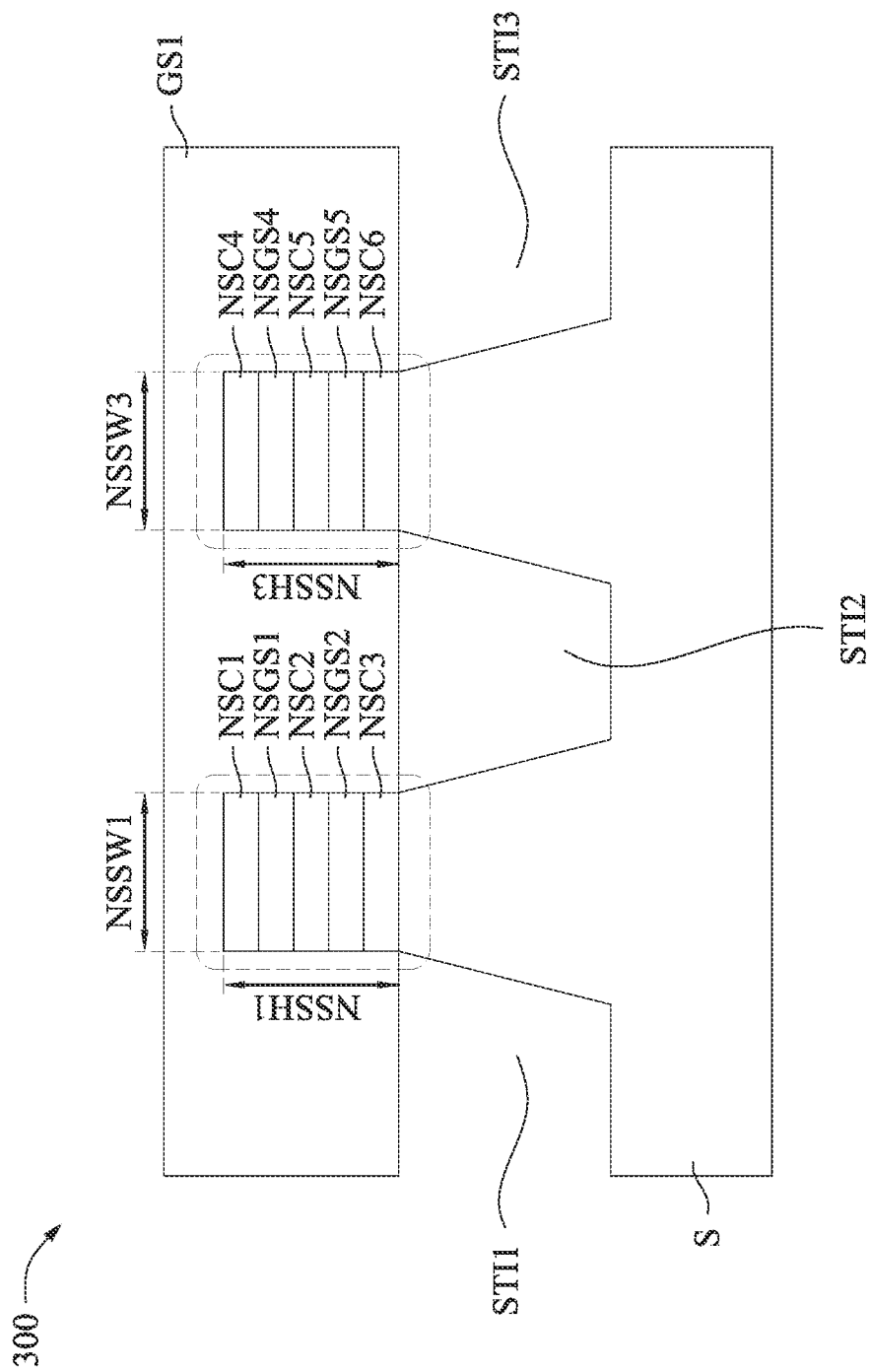
FIG. 3 depicts an IC structure, in accordance with some embodiments.

FIG. 3 depicts an IC structure 300. In some embodiments, the IC structure 300 is a y-y' cross-sectional view of an IC structure manufactured based on the generated IC layout diagram 200. The IC structure 300 includes nano-sheet structures NSS1 and NSS3. The nano-sheet structures are formed on top of a substrate S and are separated/isolated by shallow trench isolation STI1-STI3, which are formed on top of the substrate S.

The nano-sheet structure NSS1 has a width NSSW1, a height NSSH1, and includes alternating layers of nano-sheet channel, such as nano-sheet channels NSC1-NSC3, and nano-sheet gate structures, such as nano-sheet gate structures NSGS1 and NSGS2. The nano-sheet structure NSS3 has a width NSSW3, a height NSSH3, and includes alternating layers of nano-sheet channel, such as nano-sheet channels NSC4, NSC5, and NSC6, and nano-sheet gate structures, such as nano-sheet gate structures NSGS4 and NSGS5.

A nano-sheet channel is (e.g., belongs to, is part of) an active area. The nano-sheet channel includes one or more of an elementary semiconductor, e.g., silicon (Si), germanium (Ge), gallium (Ga), nitrogen (N), arsenic (As), a compound semiconductor, e.g., silicon germanium (SiGe), silicon carbide (SiC), gallium arsenide (GaAs), gallium phosphide (GaP), indium phosphide (InP), indium arsenide (InAs), or indium antimonide (ISb), or an alloy semiconductor, e.g., GaAsP, AlInAs, AlGaAs, GaInAs, GaInP, or GaInAsP, or the like. In some embodiments, the nano-sheet channel has a width in the second direction (e.g., the Y direction) between 5 nm and 60 nm.

Figure 4:
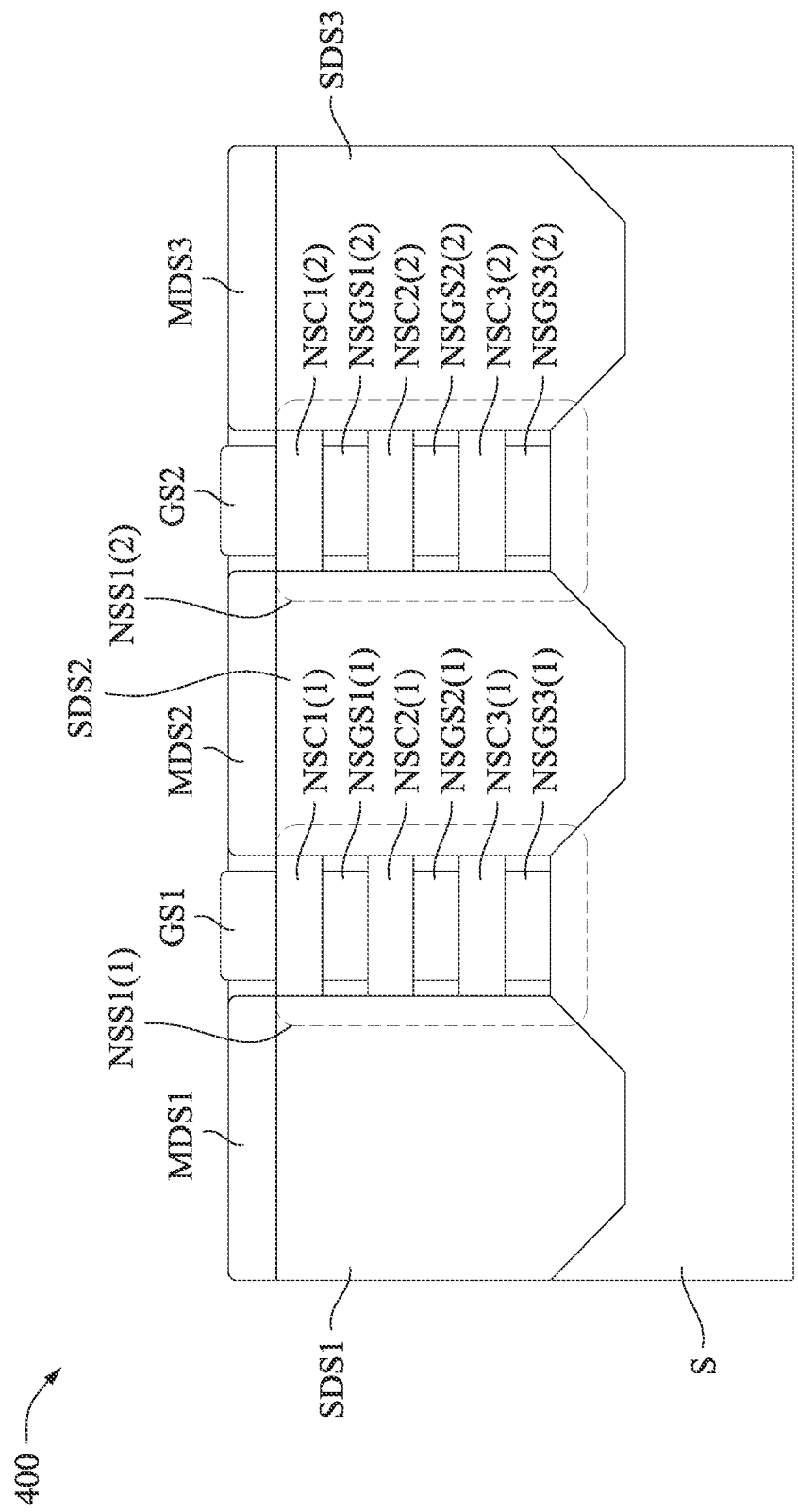
FIG. 4 depicts an IC structure, in accordance with some embodiments.

FIG. 4 depicts an IC structure 400. In some embodiments, the IC layout structure 400 is an x-x' cross-sectional view of an IC structure manufactured based on the generated IC layout diagram 200. The IC structure includes nano-sheet structures NSS1(1) and NSS1(2) formed over the substrate S. In some embodiments, NSS1(1) and NSS1(2) are portions of the nano-sheet structure NSS1. In some embodiments, NSS1(1) and NSS1(2) are portions remaining after etching back NSS1 to form a trench 1438 with respect to FIG. 14F.

Gate structures GS1 and GS2 (which correspond to GR1 and GR2 of the IC layout diagram 200, respectively) overlap (e.g., are formed over) NSS1(1) and NSS1(2), respectively. The nano-sheet structures NSS1(1) and NSS1(2) are separated and surrounded by source/drain (S/D) structures SDS1, SDS2, and SDS3, which are formed over S. Metal-like defined (MD) structures MDS1-MDS3 overlap SDS1-SDS3, respectively.

An S/D structure is a semiconductor structure within an active area, adjacent to or including portions of the one or more fins, and configured to have a doping type opposite to that of other portions of the active area. In some embodiments, an S/D structure is configured to have lower resistivity than other portions of the active area, e.g., by including one or more portions having doping concentrations greater than one or more doping concentrations otherwise present throughout the active area. In various embodiments, S/D structures include epitaxial regions of a semiconductor material, e.g., silicon (Si), boron (B), phosphorus (P), germanium (Ge), carbon (C), SiGe, and/or SiC. In an IC layout diagram, an S/D structure is defined by an S/D region.

In some embodiments, an MD structure includes a portion of at least one metal layer, e.g., a contact layer, overlying and contacting the S/D structure and having a thickness sufficiently small to enable formation of an insulation layer between the MD segment and an overlying metal layer, e.g., a metal zero layer. In various embodiments, an MD segment includes one or more of copper (Cu), silver (Ag), tungsten (W), titanium (Ti), nickel (Ni), tin (Sn), aluminum (Al), cobalt (Co), ruthenimum (Ru), or another metal or material suitable for providing a low resistance electrical connection between IC structure elements, i.e., a resistance level below a predetermined threshold corresponding to one or more tolerance levels of a resistance-based effect on circuit performance.

In various embodiments, the MD segment includes a section of the semiconductor substrate and/or an epitaxial layer having a doping level, e.g., based on an implantation process, sufficient to cause the segment to have the low resistance level. In various embodiments, a doped MD segment includes one or more of silicon (Si), silicon-germanium (SiGe), silicon-carbide (SiC), boron (B), phosphorous (P), arsenic (As), gallium (Ga), nitrogen (N), a metal as discussed above, or another material suitable for providing the low resistance level. In some embodiments, an MD segment includes a dopant having a doping concentration of about $1*10^{16}$ per cubic centimeter (cm') or greater. In an IC layout diagram, an MD structure is defined by an MD region. In some embodiments, MD regions overlap one or more of the active regions that are not overlapped by gate regions, with respect to FIG. 2. In some embodiments, the MD region has a width in the second direction (e.g., the Y direction) of 10 nm to 50 nm.

At operation 130, in some embodiments, the IC layout diagram is generated and stored in a storage device. Generating the IC layout diagram is performed by a processor, e.g., processor 1202 of IC layout diagram generation system 1200 discussed below with respect to FIG. 12. In some embodiments, generating the IC layout diagram includes generating some or all of IC design layout diagram 1322 discussed below with respect to FIG. 13.

In various embodiments, storing the IC layout diagram in the storage device includes storing the IC layout diagram in a non-volatile, computer-readable memory or a cell library, e.g., a database, and/or includes storing the IC layout diagram over a network. In various embodiments, storing the IC layout diagram in the storage device includes storing the IC layout diagram in fabrication unit 1220 or over network 1214 of IC layout diagram generation system 1200, discussed below with respect to FIG. 12.

In various embodiments, generating and storing the IC layout diagram includes generating and storing one or more of IC layout diagrams 200 discussed above with respect to FIG. 2, IC layout diagrams 600B-800B discussed below with respect to FIGS. 6B-8B, or IC layout diagram 900 discussed below with respect to FIG. 9.

At operation 140, in some embodiments, at least one of one or more semiconductor masks, or at least one component in a layer of a semiconductor IC is fabricated based on the IC layout diagram. Fabricating one or more semiconductor masks or at least one component in a layer of a semiconductor IC is discussed below with respect to IC manufacturing system 1300 and FIG. 13.

In various embodiments, fabricating one or more semiconductor masks or at least one component in the layer of the semiconductor IC is based on one or more of IC layout diagrams 200 discussed above with respect to FIG. 2, IC layout diagrams 600B-800B discussed below with respect to FIGS. 6B-8B, or IC layout diagram 900 discussed below with respect to FIG. 9.

At operation 150, in some embodiments, one or more manufacturing operations are performed based on the IC layout diagram. In some embodiments, performing one or more manufacturing operations includes performing one or more lithographic exposures based on the IC layout diagram. Performing one or more manufacturing operations, e.g., one or more lithographic exposures, based on the IC layout diagram is discussed below with respect to FIG. 13.

In various embodiments, performing one or more manufacturing operations is based on one or more of IC layout diagrams 200 discussed above with respect to FIG. 2, IC layout diagrams 600-800 discussed below with respect to FIGS. 6B-8B, or IC layout diagram 900 discussed below with respect to FIG. 9.

By executing some or all of the operations of method 100, an IC layout diagram, e.g., IC layout diagrams 200, is generated in which a cell includes at least one nano-sheet FinFET having a wider nano-sheet structure than at least one other nano-sheet FinFET in the cell, wherein the wider nano-sheet structure is abutted to the narrower nano-sheet structure. For a given cell height, the abutting of differing nano-sheet widths enables optimization of driving ability, speed, power, and area of an associated IC device compared to approaches in which each FinFET of a cell includes one or more rows of nano-sheet structures, wherein each row has a constant nano-sheet structure width.

In some embodiments, some or all of method 500 is executed by a processor of a computer. In some embodiments, some or all of method 500 is executed by processor 1202 of an IC layout diagram generation system 1200, discussed below with respect to FIG. 12.

Some or all of the operations of method 500 are capable of being performed as part of a design procedure performed in a design house, e.g., design house 1320 discussed below with respect to FIG. 13.

FIG. 5 is a flowchart of a method 500 of operating an IC manufacturing system, in accordance with some embodiments. In some embodiments, operating the IC manufacturing system includes generating an IC layout diagram, e.g., an IC layout diagram 200, IC layout diagrams 600B-800B and IC layout diagram 900 discussed below with respect to FIG. 2, FIGS. 6B-8B and FIG. 9, corresponding to an IC structure manufactured based on the generated IC layout diagram as part of an IC device. Non-limiting examples of IC devices include memory circuits, logic devices, processing devices, signal processing circuits, or the like.

In some embodiments, the operations of method 500 are performed in the order depicted in FIG. 5. In some embodiments, the operations of method 500 are performed simultaneously and/or in an order other than the order depicted in FIG. 5. In some embodiments, one or more operations are performed before, between, during, and/or after performing one or more operations of method 500.

FIGS. 2, 6B-8B, and 9 are depictions of non-limiting examples of corresponding IC layout diagrams 200, 600B-800B, and 900 generated by executing one or more operations of method 500 as discussed below, in some embodiments. IC layout diagrams 200, 600B-800B, and 900 are simplified for the purpose of clarity. In various embodiments, one or more of IC layout diagrams 200, 600B-800B, and 900 includes features in addition to those depicted in FIGS. 2, 6B-8B, and 9, e.g., one or more transistor elements, power rails, isolation structures, wells, conductive elements, or the like.

At operation 510, a first cell is arranged as a first nano-sheet structure and a second nano-sheet structure. The first and second nano-sheet structures each extend in a first direction and have a first and second width, respectively, in a second direction perpendicular to the first direction. The second nano-sheet structure is separated from the first nano-sheet structure by a first distance along the second direction. In some embodiments, the first nano-sheet structure is located in a first active region in the first cell and the second nano-sheet structure is located in a second active region in the first cell.

At operation 520, a second cell is arranged as a third nano-sheet structure and a fourth nano-sheet structure. The third and fourth nano-sheet structures each extend in the first direction and have a third and fourth width, respectively, in the second direction. The fourth nano-sheet structure is separated from the third nano-sheet structure by a second distance along the second direction. The third width is less than the first width and the fourth width is less than the third width. In some embodiments, the third nano-sheet structure is located in a third active region in the second cell and the fourth nano-sheet structure is located in a fourth active region in the second cell. In some embodiments, the third active region abuts the first active region along the second direction and the fourth active region abuts the second active region along the second direction.

At operation 530, the second cell is aligned with the first cell such that the third nano-sheet structure abuts with the first nano-sheet structure along the second direction and the fourth nano-sheet structure abuts with the second nano-sheet structure along the second direction. In some embodiments, the first and third nano-sheet structures are a third distance along the second direction from first and second cell border segments, respectively, of the first and second cells, respectively. The first and the second cell border segments extend in the first direction and abut with each other. In some embodiments, the second and fourth nano-sheet structures are a fourth distance along the second direction from third and fourth cell border segments, respectively, of the first and second cells, respectively. The third and the fourth cell border segments extend in the first direction and abut with each other.

FIG. 6A depicts a circuit diagram 600A of a multi-stage buffer, in accordance with some embodiments. The multi-stage buffer includes a first inverter stage P1 having an output coupled to the input of a second inverter stage P2. In operation, the multi-stage buffer 600A receives an input (I) and generates a buffered output (Z).

FIG. 6B depicts an IC layout diagram 600B, in accordance with some embodiments. The IC layout diagram 600B corresponds to the circuit diagram 600A. The IC layout diagram 600B includes a first IC layout cell C1 and a second IC layout cell C2. The IC layout cell of the first inverter stage C1 corresponds to the circuit diagram of P1. The IC layout cell of the first inverter stage C1 includes nano-sheet structures NSS10 and NSS20. The nano-sheet structures NSS10 and NSS20 extend in a first direction and have a first width and second width in a second direction, respectively. The IC layout cell of the second inverter stage C2 corresponds to the circuit diagram of P2. The IC layout cell of the second inverter stage C2 includes nano-sheet structures NSS30 and NSS40. The nano-sheet structures NSS30 and NSS40 extend in the first direction and have a third width and fourth width in the second direction, respectively. The nano-sheet structures NSS30 and NSS40 abut with NSS10 and NSS20, respectively, along the second direction. The third width and the fourth width are greater than the first width and the second width, respectively. Thus, the driving ability of C2 is greater than the driving ability of C1. The IC layout diagram 600B may be implemented with cells having a first single-cell-height HA. In some embodiments, the widths of nano-sheet structures in HB are less than the widths of nano-sheet structures in HA.

Figure 7B:
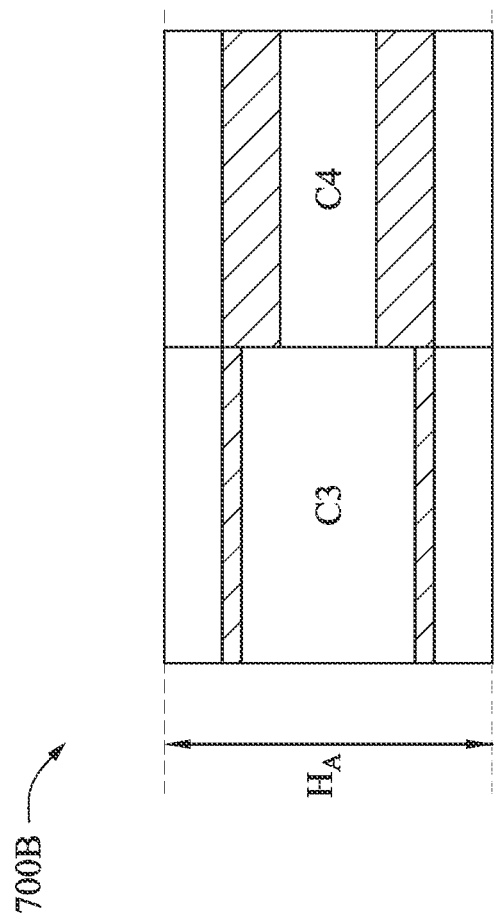
FIG. 7B depicts an IC layout diagram, in accordance with some embodiments.
Figure 7A:
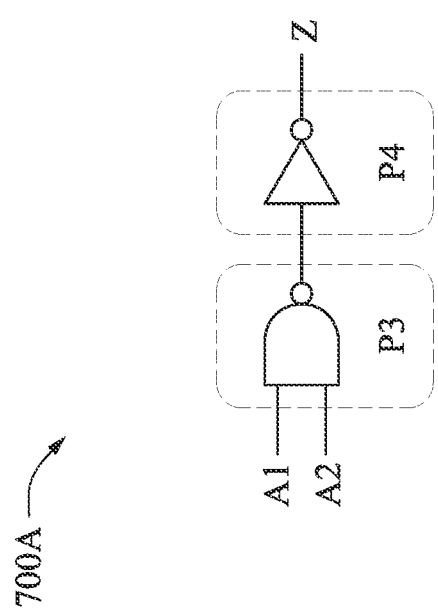
FIG. 7A depicts a circuit diagram of a multi-stage logic gate, in accordance with some embodiments.

FIG. 7A depicts a circuit diagram 700A of a multi-stage logic gate, in accordance with some embodiments. The multi-stage logic gate includes a NAND gate P3 having an output coupled to the input of an inverter stage P4. In operation, the multi-stage logic gate 700A receives two inputs (A1 and A2) and generates a buffered output (Z).

FIG. 7B depicts an IC layout diagram 700B, in accordance with some embodiments. The IC layout diagram 700B corresponds to the circuit diagram 700A. The IC layout diagram 700B includes a first IC layout cell C3 and a second IC layout cell C4. The IC layout cell of the first inverter stage C3 corresponds to the circuit diagram of P3. The IC layout cell of the first inverter stage C3 is similar to C1. The IC layout cell of the second inverter stage C4 corresponds to the circuit diagram of P4. The IC layout cell of the second inverter stage C4 is similar to C2.

Figures 8A, 8B:
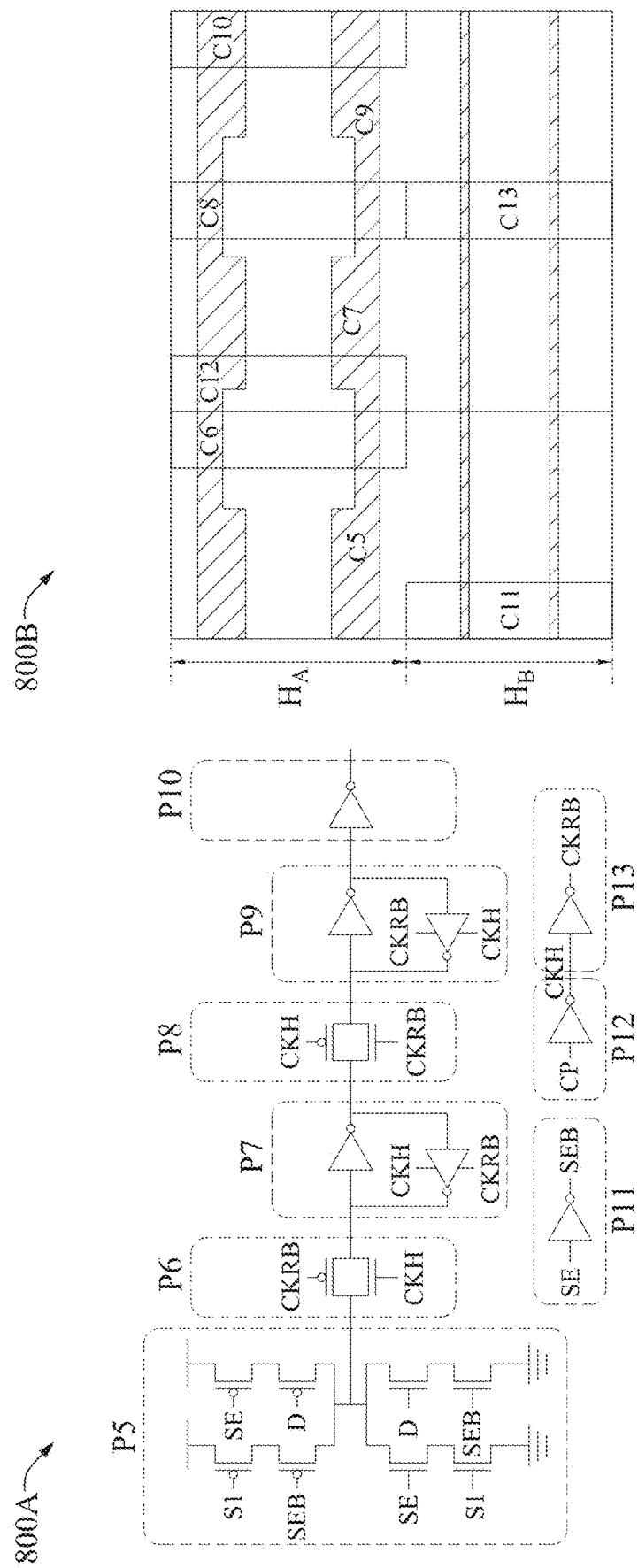
FIG. 8A depicts a circuit diagram of a scan flip-flop, in accordance with some embodiments.
FIG. 8B depicts an IC layout diagram, in accordance with some embodiments.

FIG. 8A depicts a circuit diagram 800A of a scan flip-flop, in accordance with some embodiments. The scan flip-flop 800A includes a multiplexer (P5) followed by a master-slave flip-flop (P6-P10). The master-slave flip-flop includes a t-gate (P6), a latch (P7) coupled to P6, a t-gate (P8) coupled to P7, a latch (P9) coupled to P8, and an inverter (P10) coupled to P9. The scan flip-flop 800A further includes a multi-stage inverter (P12-P13). The first inverter stage (P12) inverts clock signal CP to generate clock signal CKB, and the second inverter stage (P13) inverts the clock signal CKB to generate clock signal CKBB. The scan flip-flop 800A further includes an inverter (P11) that inverts the signal at the terminal SE to generate output at terminal SEB. When the scan flip-flop 800A operates in scan test mode, the voltage at an output of P5 is controlled by terminal SI. When the scan flip-flop 800A operates in normal operation mode, the voltage at the output of P5 is controlled by terminal D.

FIG. 8B depicts an IC layout diagram 800B, in accordance with some embodiments. The IC layout diagram 800B corresponds to the circuit diagram 800A. The IC layout diagram 800B includes a first IC layout cells C5-C13, which correspond to the circuit diagrams of P5-P13, respectively. Some IC layout cells, or portions thereof, such as IC layout cells C5, C7, C9, and C12 are similar to cell 200A with respect to FIG. 2. Each includes a first nano-sheet structure of a first width and abutted to a second nano-sheet structure of a second width. The first width is greater than the second width. The IC layout diagram 800B may be implemented with first cells having a first single-cell-height HA, second cells having a second single-cell-height HB, and third cells having a first double-cell-height HA+HB. In some embodiments, HA is different (e.g., greater or less than) HB. In some embodiments, the widths of nano-sheet structures in HB are less than the widths of nano-sheet structures in HA.

Figure 9:
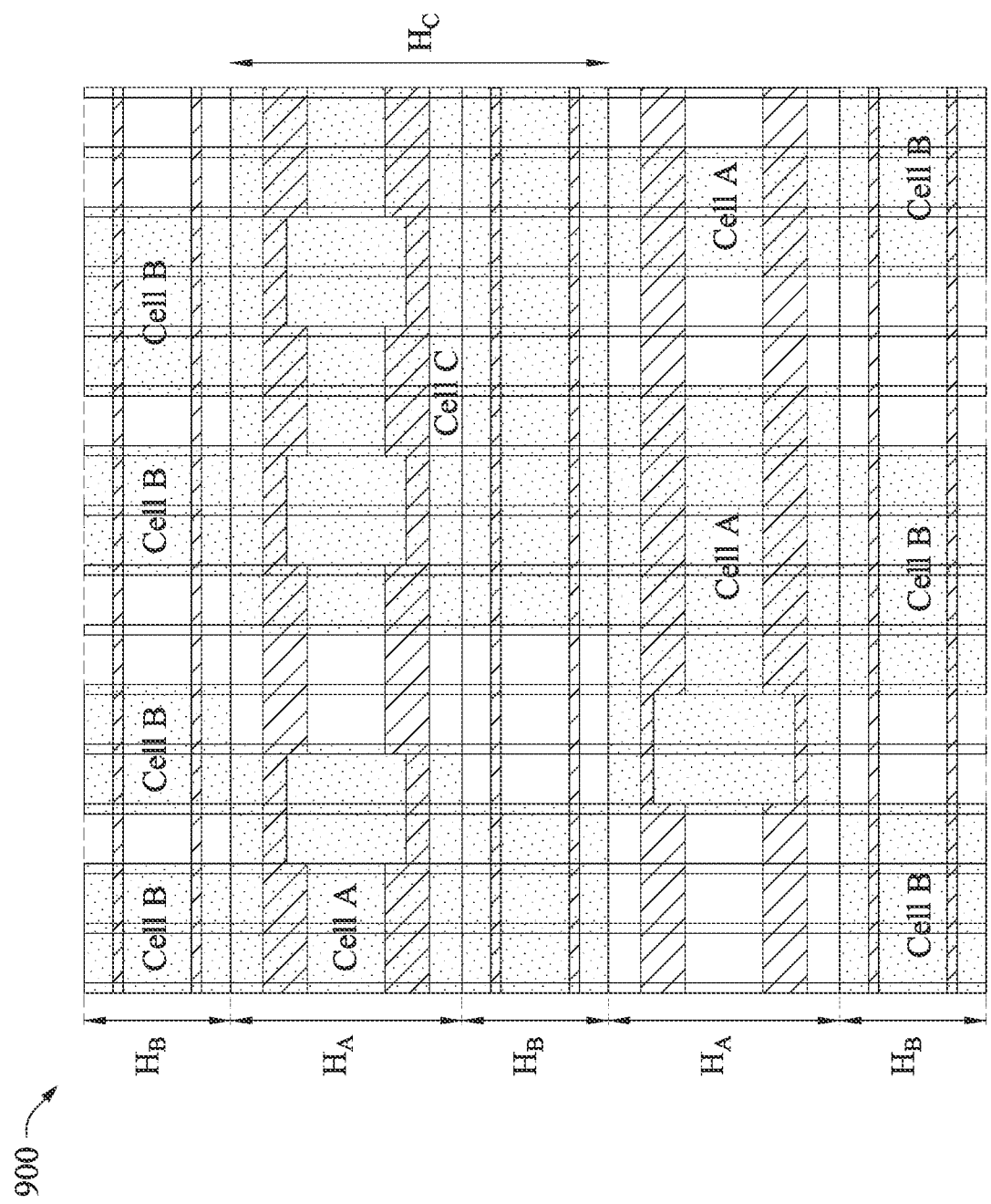
FIG. 9 depicts an IC layout diagram, in accordance with some embodiments.

FIG. 9 depicts an IC layout diagram 900, in accordance with some embodiments. The IC layout diagram 900 includes three types of cells, respectively labeled Cell_A, CellB, and Cell_C, that are each formed using nano-sheet structures. In some embodiments, the cells Cell_A are formed using nano-sheet structures of at least one of a first width and a second width and have a cell height HA. The cells Cell_B are formed using nano-sheet structures of a third width and have a cell height HB. The second width is less than the first width. The third width is less than the first width. In some embodiments, the third width is less than the second width. The cells Cell_C are formed using nano-sheet structures of the third width and at least one of the first width and the second width. The cells Cell_C have a cell height HA+HB.

Figure 10:
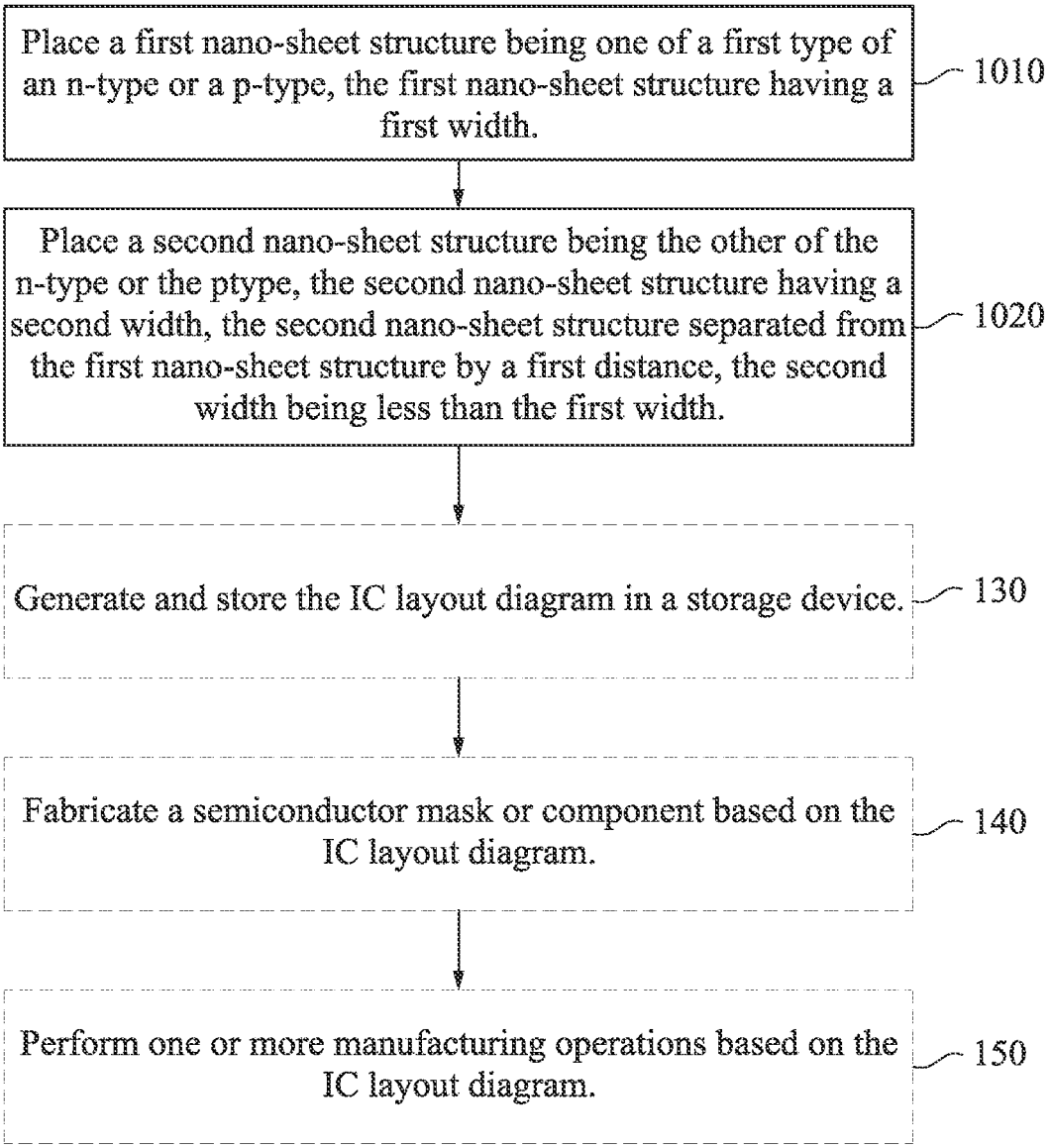
FIG. 10 is a flowchart of a method of operating an IC manufacturing system, in accordance with some embodiments.

FIG. 10 is a flowchart of a method 1000 of operating an IC manufacturing system, in accordance with some embodiments. In some embodiments, operating the IC manufacturing system includes generating an IC layout diagram, e.g., an IC layout diagram 200, IC layout diagrams 600B-800B and IC layout diagram 900 discussed below with respect to FIG. 2, FIGS. 6B-8B and FIG. 9, corresponding to an IC structure manufactured based on the generated IC layout diagram as part of an IC device. Non-limiting examples of IC devices include memory circuits, logic devices, processing devices, signal processing circuits, or the like.

In some embodiments, the operations of method 1000 are performed in the order depicted in FIG. 10. In some embodiments, the operations of method 1000 are performed simultaneously and/or in an order other than the order depicted in FIG. 10. In some embodiments, one or more operations are performed before, between, during, and/or after performing one or more operations of method 1000.

FIGS. 2, 6B-8B, and 9 are depictions of non-limiting examples of corresponding IC layout diagrams 200, 600B-800B, and 900 generated by executing one or more operations of method 1000, in some embodiments.

At operation 1010, a first nano-sheet structure is placed in an IC layout. The first nano-sheet structure is one of a first type of an n-type or a p-type. The first nano-sheet structure extends in a first direction and has a first width in a second direction perpendicular to the first direction.

At operation 1020, a second nano-sheet structure is placed in the IC layout. The second nano-sheet structure is the other of a first type of an n-type or a p-type. The second nano-sheet structure extends in the first direction and has a second width in the second direction. The second nano-sheet structure is separated from the first nano-sheet structure by a first distance. The second width is less than the first width.

In some embodiments, third and fourth nano-sheet structures are placed in the IC layout. The third and fourth non-sheet structures extend in the first direction and have a third and fourth width, respectively. The third nano-sheet structure abuts the first nano-sheet structure along the second direction. The third width is less than the first width. The fourth nano-sheet structure abuts the second nano-sheet structure along the second direction. The fourth width is less than the second width.

Figure 11:
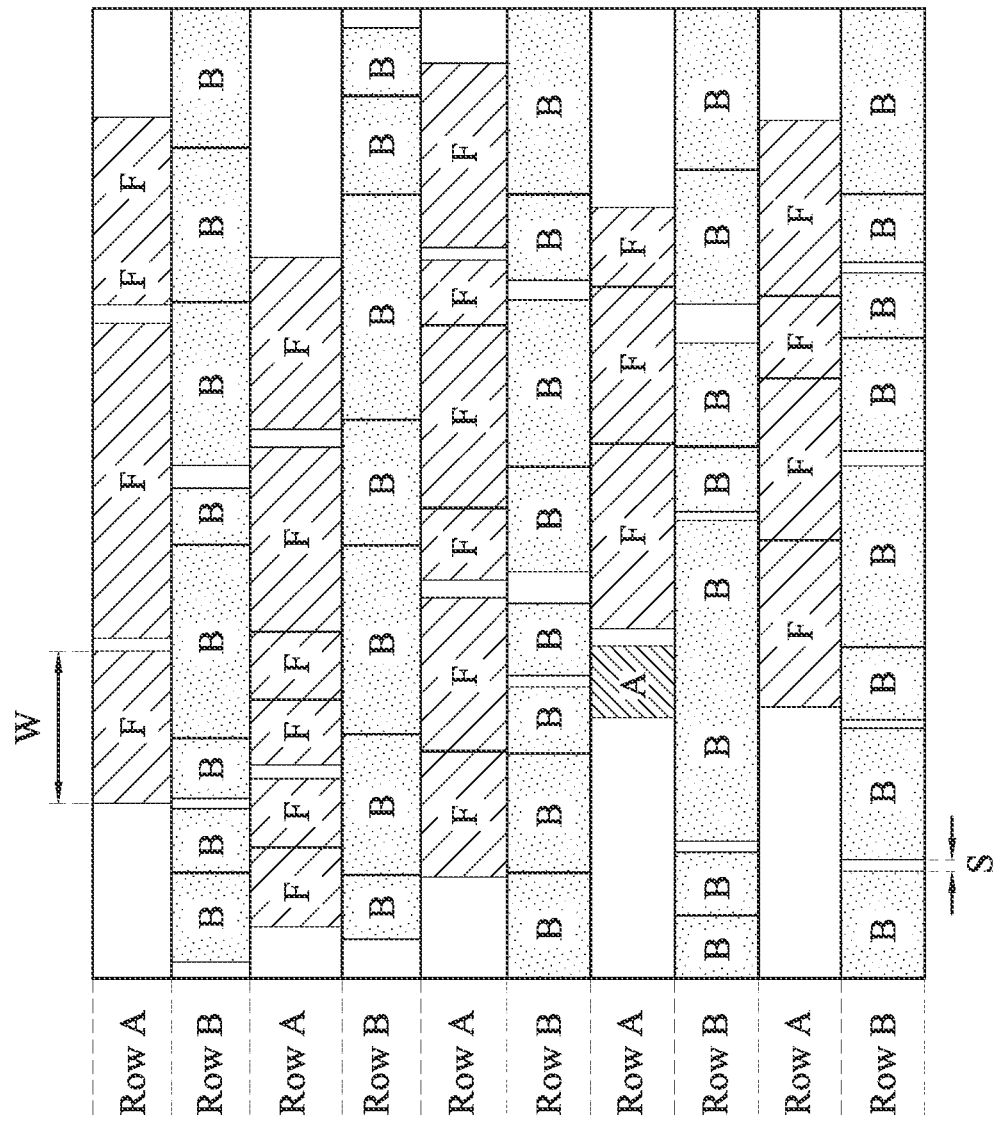
FIG. 11 depicts an IC layout diagram, in accordance with some embodiments.

FIG. 11 depicts an IC layout diagram 1100, in accordance with some embodiments. Referring now to FIG. 11, the layout diagram 1100 includes cells A placed in row A, cells F placed in row A, and cells B placed in row B. Cell F is an weak driving cell that can be only placed in Row A. There will be high-driving cells and low-driving cells congestion areas in a macro design. When Cell F includes a FinFET device, which is digitized/fixed driving, Cell F cannot be implanted in conventional work due to FinFET being digitized/fixed driving. In contrast, when Cell F includes a nano-sheet device, its width (e.g., W) can be flexibly tuned to very low driving in Row A (Cell F) such that chip density can be improved in low-driving cell (Cell B) congestion region. As shown, the cells A, B, and F are single height cells. In some embodiments, cells A, B, or F, or additional cells can include multi-height cells.

Figure 12:
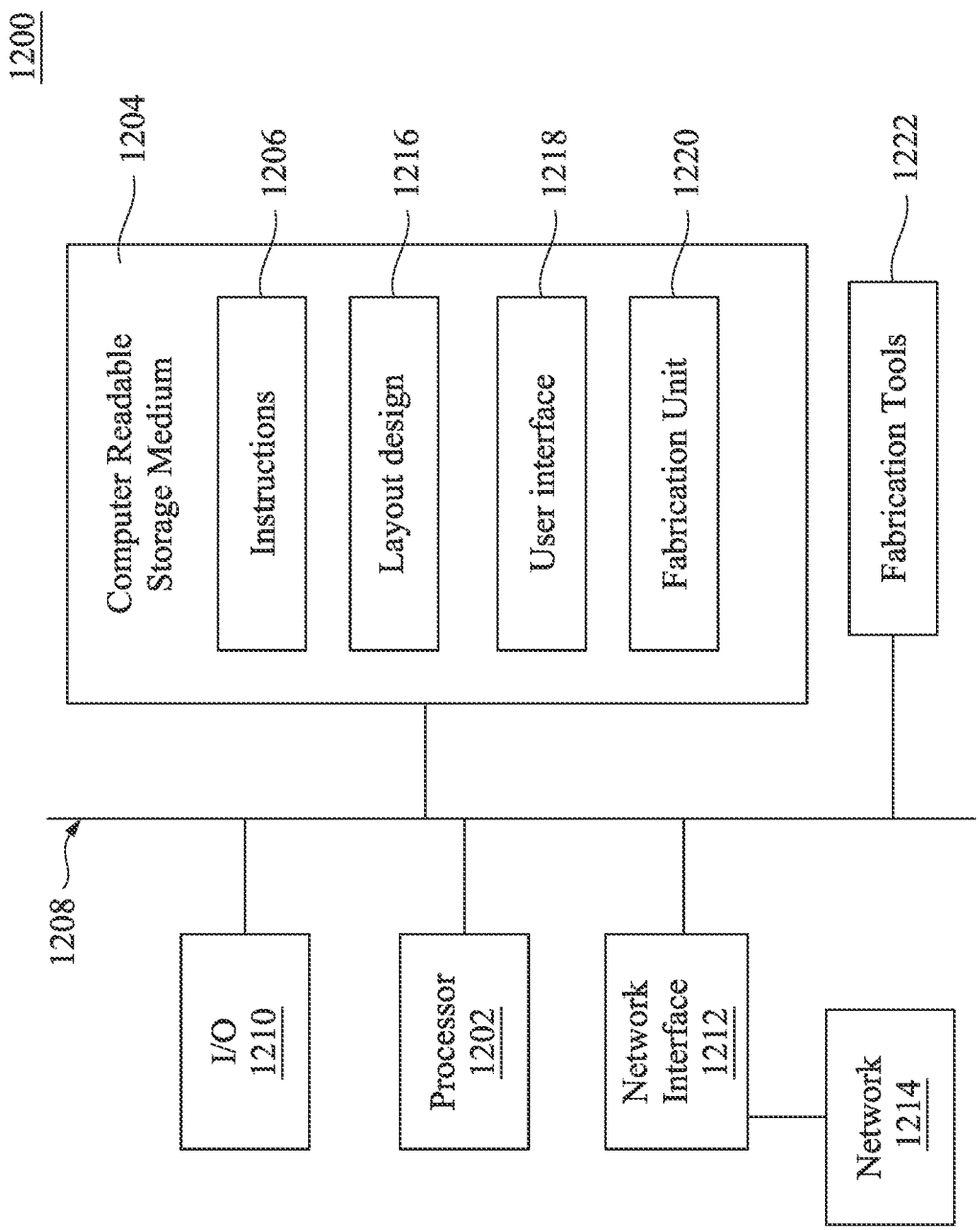
FIG. 12 is a schematic view of a system for designing and manufacturing an IC layout design in accordance with some embodiments.

FIG. 12 is a schematic view of a system 1200 for designing and manufacturing an IC layout design in accordance with some embodiments. In some embodiments, system 1200 generates or places one or more IC layout designs described herein. In some embodiments, the system 1200 manufactures one or more ICs based on the one or more IC layout designs described herein. The system 1200 includes a hardware processor 1202 and a non-transitory, computer readable storage medium 1204 encoded with, e.g., storing, the computer program code 1206, e.g., a set of executable instructions. Computer readable storage medium 1204 is configured for interfacing with manufacturing machines for producing the integrated circuit. The processor 1202 is electrically coupled to the computer readable storage medium 1204 by a bus 1208. The processor 1202 is also electrically coupled to an I/O interface 1210 by bus 1208. A network interface 1212 is also electrically connected to the processor 1202 by bus 1208. Network interface 1212 is connected to a network 1214, so that processor 1202 and computer readable storage medium 1204 are capable of connecting to external elements via network 1214. The processor 1202 is configured to execute the computer program code 1206 encoded in the computer readable storage medium 1204 in order to cause system 1200 to be usable for performing a portion or all of the operations as described in method 1000 or 500.

In some embodiments, the processor 1202 is a central processing unit (CPU), a multi-processor, a distributed processing system, an application specific integrated circuit (ASIC), and/or a suitable processing unit.

In some embodiments, the computer readable storage medium 1204 is an electronic, magnetic, optical, electromagnetic, infrared, and/or a semiconductor system (or apparatus or device). For example, the computer readable storage medium 1204 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1204 includes a compact disk-read only memory (CD-ROM), a compact disk-read/write (CD-R/W), and/or a digital video disc (DVD).

In some embodiments, the storage medium 1204 stores the computer program code 1206 configured to cause system 1200 to perform method 100, 500, or 1000. In some embodiments, the storage medium 1204 also stores information needed for performing method 100, 500, or 1000 as well as information generated during performance of method 100, 500, or 1000, such as layout design 1216 and user interface 1218 and fabrication unit 1220, and/or a set of executable instructions to perform the operation of method 100, 500, or 1000. In some embodiments, layout design 1216 comprises one or more layout patterns for one of the layout designs 200, 600B-800B, or 900.

In some embodiments, the storage medium 1204 stores instructions (e.g., computer program code 1206) for interfacing with manufacturing machines. The instructions (e.g., computer program code 1206) enable processor 1202 to generate manufacturing instructions readable by the manufacturing machines to effectively implement method 100, 500, or 1000 during a manufacturing process.

System 1200 includes I/O interface 1210. I/O interface 1210 is coupled to external circuitry. In some embodiments, I/O interface 1210 includes a keyboard, keypad, mouse, trackball, trackpad, and/or cursor direction keys for communicating information and commands to processor 1202.

System 1200 also includes network interface 1212 coupled to the processor 1202. Network interface 1212 allows system 1200 to communicate with network 1214, to which one or more other computer systems are connected. Network interface 1212 includes wireless network interfaces such as BLUETOOTH, WIFI, WIMAX, GPRS, or WCDMA; or wired network interface such as ETHERNET, USB, or IEEE-13154. In some embodiments, method 100, 500, or 1000 is implemented in two or more systems 1200, and information such as layout design, user interface and fabrication unit are exchanged between different systems 1200 by network 1204.

System 1200 is configured to receive information related to a layout design through I/O interface 1210 or network interface 1212. The information is transferred to processor 1202 by bus 1208 to determine a layout design for producing an IC. The layout design is then stored in computer readable medium 1204 as layout design 1216. System 1200 is configured to receive information related to a user interface through I/O interface 1210 or network interface 1212. The information is stored in computer readable medium 1204 as user interface 1218. System 1200 is configured to receive information related to a fabrication unit through I/O interface 1210 or network interface 1212. The information is stored in computer readable medium 1204 as fabrication unit 1220. In some embodiments, the fabrication unit 1220 includes fabrication information utilized by system 1200.

In some embodiments, the system 1200 may also be associated with various fabrication tools 1222. Among other things, the fabrication tools 1222 may be used to prepare and fabricate a set of masks based on the standard cell layout created by a standard cell layout application. The set of masks may define the geometry for the photolithography steps used during semiconductor fabrication of the circuit.

To prepare a set of masks, the fabrication tools 1222 may be used to translate the standard cell layout of the circuit into a representative data file ("RDF"). The RDF may then be used to fabricate a set of physical masks to fabricate the circuit.

In some embodiments, preparing the set of masks may include performing an optical proximity correction (OPC) using lithography enhancement techniques to compensate for image errors, such as those that can arise from diffraction, interference, other process effects, and the like, in the standard cell layout. In some embodiments, a mask rule checker (MRC) of the fabrication tools 1222 may check the standard cell layout that has undergone processes in OPC with a set of mask creation rules. The mask creation rules may contain certain geometric and/or connectivity restrictions to ensure sufficient margins, to account for variability in semiconductor manufacturing processes, and the like. In some embodiments, the MRC may modify the standard cell layout to compensate for limitations during the fabrication of the set of masks. In some embodiments, preparing the set of masks may also include resolution enhancement techniques (RET), such as off-axis illumination, sub-resolution assist features, phase-shifting masks, other suitable techniques, and the like or combinations thereof.

The preparation of the set of masks may further include, in some embodiments, lithography process checking (LPC) that may simulate processes implemented to fabricate the circuit. LPC may simulate these processes based on the standard cell layout to create a simulated manufactured device of the circuit. LPC may take into account various factors, such as aerial image contrast, depth of focus ("DOF"), mask error enhancement factor ("MEEF"), other suitable factors, and the like or combinations thereof, to simulate the fabrication of the circuit. In some embodiments, after a simulated manufactured device has been created by LPC, if the simulated device does not satisfy certain design rules, OPC and/or MRC may be repeated to further refine the standard cell layout.

To fabricate the set of masks, a mask writer may convert the RDF to an image on a substrate, such as a mask (reticle) or a semiconductor wafer. In some embodiments, an electron-beam (e-beam) or a mechanism of multiple e-beams may be used to form a mask pattern on a semiconductor wafer to form the mask. In some embodiments, the mask pattern may include one or more opaque regions and one or more transparent regions. A radiation beam, such as an ultraviolet (UV) beam, used to expose the image sensitive material layer (e.g., photoresist) which has been coated on the semiconductor wafer, may be blocked by the opaque regions and transmits through the transparent regions. In one example, the mask pattern may include a transparent substrate (e.g., fused quartz) and an opaque material (e.g., chromium) coated in the opaque regions to form the mask. In other embodiments, other or additional techniques may be used to fabricate the masks.

Once the masks are fabricated, a fabrication entity (e.g., a manufacturing facility or semiconductor foundry) may use the fabricated masks to fabricate the circuit. In some embodiments, fabricating the circuit may involve depositing one or more materials in/on a semiconductor wafer using the mask (or masks). The semiconductor wafer may include a silicon substrate or other substrate having material layers formed thereon. The semiconductor wafer may further include one or more of various doped regions, dielectric features, multilevel interconnects, and the like formed using one or more of the masks.

In some embodiments, method 100, 500, or 1000 is implemented as a standalone software application for execution by a processor. In some embodiments, method 100, 500, or 1000 is implemented as a software application that is a part of an additional software application. In some embodiments, method 100, 500, or 1000 is implemented as a plug-in to a software application. In some embodiments, method 100, 500, or 1000 is implemented as a software application that is a portion of an EDA tool. In some embodiments, method 100, 500, or 1000 is implemented as a software application that is used by an EDA tool. In some embodiments, the EDA tool is used to generate a layout design of the integrated circuit device. In some embodiments, the layout design is stored on a non-transitory computer readable medium. In some embodiments, the layout design is generated using a tool such as VIRTUOSO® available from CADENCE DESIGN SYSTEMS, Inc., or another suitable layout generating tool. In some embodiments, the layout design is generated based on a netlist which is created based on the schematic design. In some embodiments, method 100, 500, or 1000 is implemented by a manufacturing device to manufacture an integrated circuit using a set of masks manufactured based on one or more layout designs generated by system 1200. In some embodiments, system 1200 is a manufacturing device to manufacture an integrated circuit using a set of masks manufactured based on one or more layout designs of the present disclosure. In some embodiments, system 1200 of FIG. 12 generates layout designs of an IC that are smaller than other approaches. In some embodiments, system 1200 of FIG. 12 generates layout designs of an IC that occupy less area than other approaches.

Figure 13:
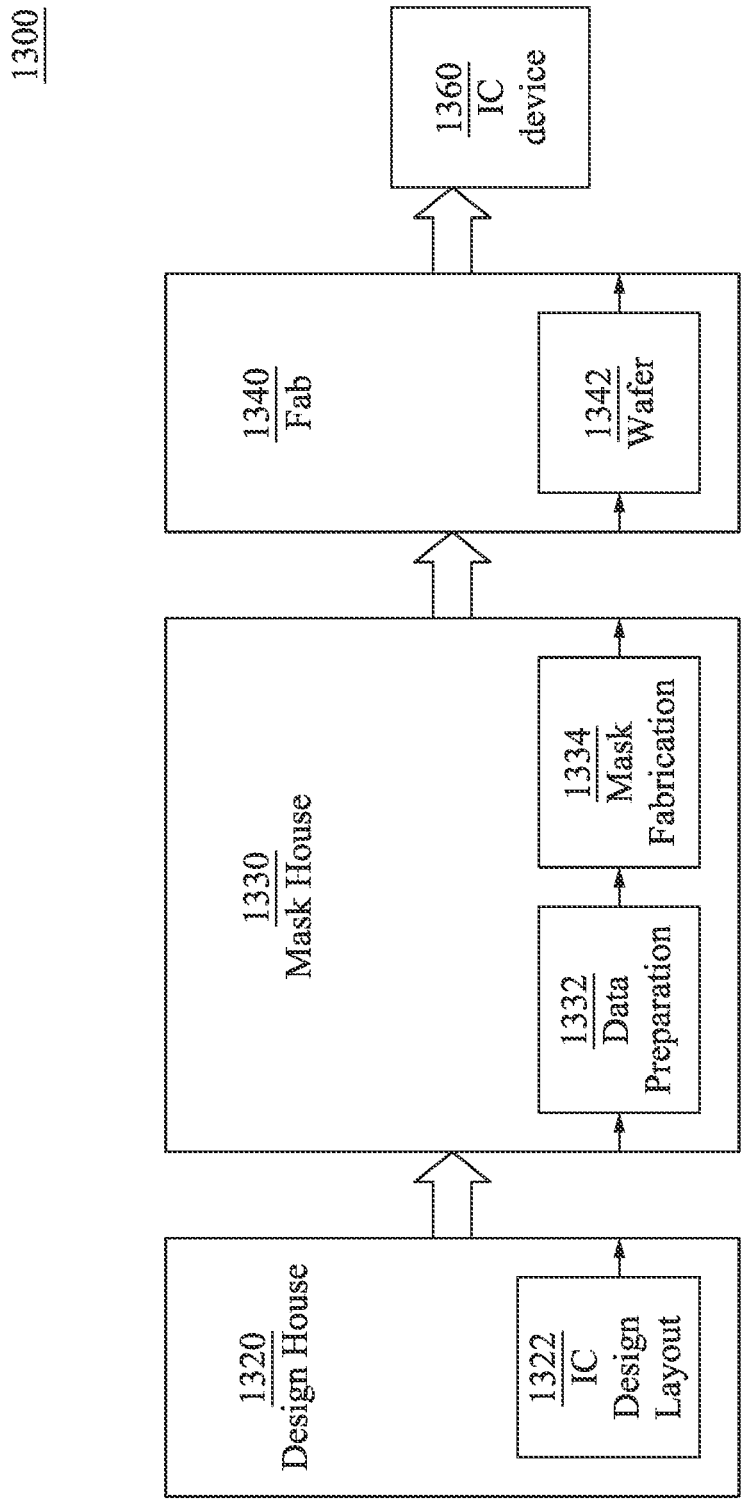
FIG. 13 is a block diagram of an integrated circuit (IC) manufacturing system, and an IC manufacturing flow associated therewith, in accordance with at least one embodiment of the present disclosure.

FIG. 13 is a block diagram of an integrated circuit (IC) manufacturing system 1300, and an IC manufacturing flow associated therewith, in accordance with at least one embodiment of the present disclosure.

In FIG. 13, IC manufacturing system 1300 includes entities, such as a design house 1320, a mask house 1330, and an IC manufacturer/fabricator ("fab") 1340, that interact with one another in the design, development, and manufacturing cycles and/or services related to manufacturing an IC device 1360. The entities in system 1300 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1320, mask house 1330, and IC fab 1340 is owned by a single larger company. In some embodiments, two or more of design house 1320, mask house 1330, and IC fab 1340 coexist in a common facility and use common resources.

Design house (or design team) 1320 generates an IC design layout 1322. IC design layout 1322 includes various geometrical patterns designed for an IC device 1360. The geometrical patterns correspond to patterns of metal, oxide, or semiconductor layers that make up the various components of IC device 1360 to be fabricated. The various layers combine to form various IC features. For example, a portion of IC design layout 1322 includes various IC features, such as an active region, gate electrode, source electrode and drain electrode, metal lines or via contacts of an interlayer interconnection, and openings for bonding pads, to be formed in a semiconductor substrate (such as a silicon wafer) and various material layers disposed on the semiconductor substrate. Design house 1320 implements a proper design procedure to form IC design layout 1322. The design procedure includes one or more of logic design, physical design or place and route. IC design layout 1322 is presented in one or more data files having information of the geometrical patterns. For example, IC design layout 1322 can be expressed in a GDSII file format or DFII file format.

Mask house 1330 includes mask data preparation 1332 and mask fabrication 1334. Mask house 1330 uses IC design layout 1322 to manufacture one or more masks to be used for fabricating the various layers of IC device 1360 according to IC design layout 1322. Mask house 1330 performs mask data preparation 1332, where IC design layout 1322 is translated into a representative data file ("RDF"). Mask data preparation 1332 provides the RDF to mask fabrication 1334. Mask fabrication 1334 includes a mask writer. A mask writer converts the RDF to an image on a substrate, such as a mask (reticle) or a semiconductor wafer. The design layout is manipulated by mask data preparation 1332 to comply with particular characteristics of the mask writer and/or requirements of IC fab 1340. In FIG. 13, mask data preparation 1332 and mask fabrication 1334 are illustrated as separate elements. In some embodiments, mask data preparation 1332 and mask fabrication 1334 can be collectively referred to as mask data preparation.

In some embodiments, mask data preparation 1332 includes optical proximity correction (OPC) which uses lithography enhancement techniques to compensate for image errors, such as those that can arise from diffraction, interference, other process effects and the like. OPC adjusts IC design layout 1322. In some embodiments, mask data preparation 1332 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1332 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 1334, which may undo part of the modifications performed by OPC in order to meet mask creation rules.

In some embodiments, mask data preparation 1332 includes lithography process checking (LPC) that simulates processing that will be implemented by IC fab 1340 to fabricate IC device 1360. LPC simulates this processing based on IC design layout 1322 to create a simulated manufactured device, such as IC device 1360. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 1322.

It should be understood that the above description of mask data preparation 1332 has been simplified for the purposes of clarity. In some embodiments, mask data preparation 1332 includes additional features such as a logic operation (LOP) to modify the IC design layout according to manufacturing rules. Additionally, the processes applied to IC design layout 1322 during mask data preparation 1332 may be executed in a variety of different orders.

After mask data preparation 1332 and during mask fabrication 1334, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology.

In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 1334 is used in a variety of processes. For example, such a mask(s) is used in an ion implantation process to form various doped regions in the semiconductor wafer, in an etching process to form various etching regions in the semiconductor wafer, and/or in other suitable processes.

IC fab 1340 is an IC fabrication entity that includes one or more manufacturing facilities for the fabrication of a variety of different IC products. In some embodiments, IC fab 1340 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry entity.

IC fab 1340 uses the mask (or masks) fabricated by mask house 1330 to fabricate IC device 1360. Thus, IC fab 1340 at least indirectly uses IC design layout 1322 to fabricate IC device 1360. In some embodiments, a semiconductor wafer 1342 is fabricated by IC fab 1340 using the mask (or masks) to form IC device 1360. Semiconductor wafer 1342 includes a silicon substrate or other proper substrate having material layers formed thereon. Semiconductor wafer further includes one or more of various doped regions, dielectric features, multilevel interconnects, and the like (formed at subsequent manufacturing steps).

System 1300 is shown as having design house 1320, mask house 1330, or IC fab 1340 as separate components or entities. However, it is understood that one or more of design house 1320, mask house 1330, or IC fab 1340 are part of the same component or entity.

FIGS. 14A-14L illustrate fabrication stages of an IC manufacturing flow of an IC structure 1400, in accordance with some embodiments. In some embodiments, the IC manufacturing flow of the IC structure 1400 is performed by the IC manufacturing system 1300 of FIG. 13. In some embodiments, the IC manufacturing flow of the IC structure 1400 is for generating IC structures including nano-sheet FinFETs.

Figure 14A:
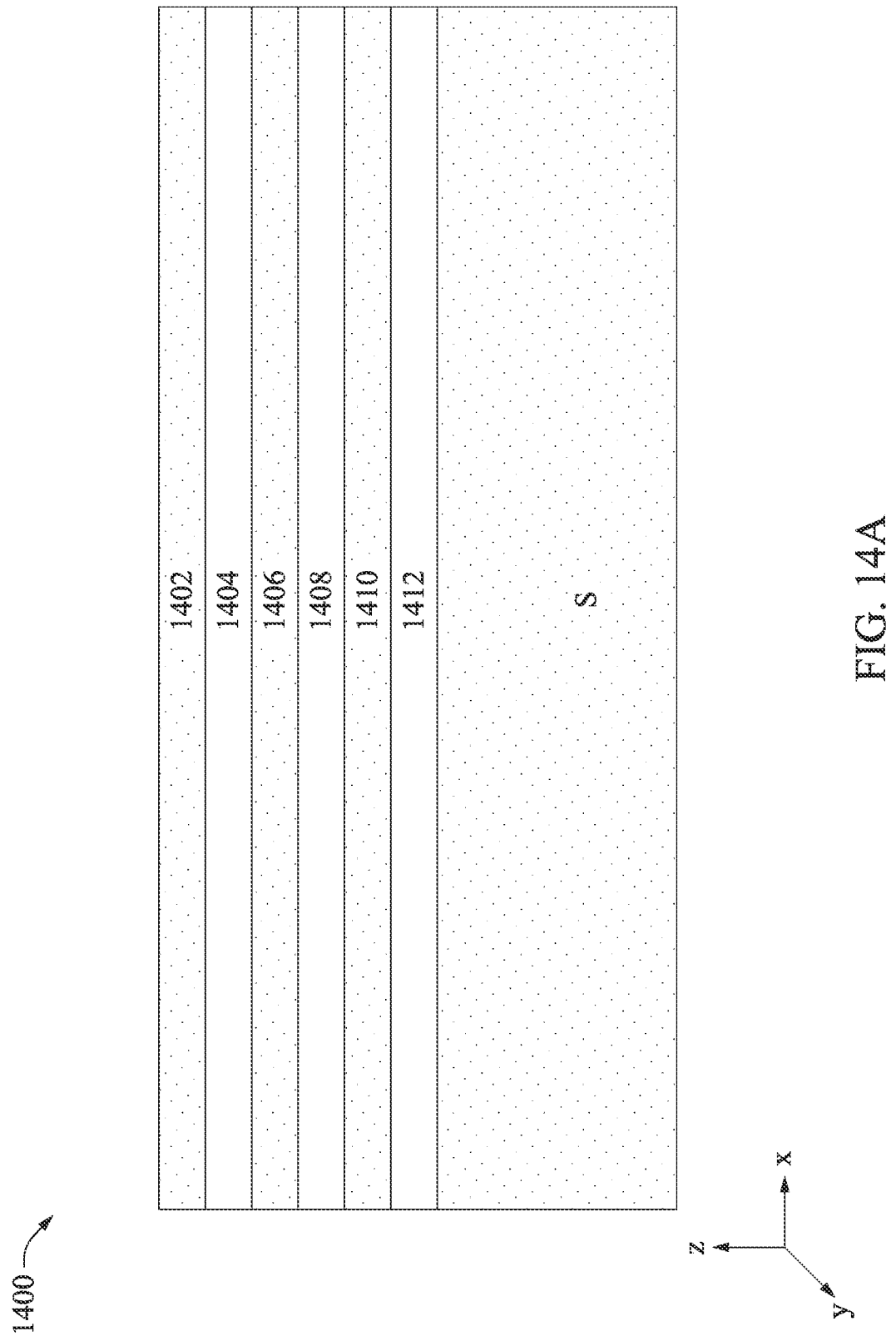
FIGS. 14A, 14B, 14C, 14D, 14E, 14F, 14G, 14H, 14I, 14J, 14K, and 14L illustrate cross-sectional views of an IC structure, at various fabrication stages of an IC manufacturing flow, in accordance with some embodiments.

FIG. 14A is an x-x' cross sectional view of the IC structure 1400 after growing nanostructures. The IC structure 1400 depicted in FIG. 14A includes substrate S, and a stack of alternating series of first and second nanostructures. The first nanostructures may include dummy gate fill structures (e.g., layers) 1404, 1408, and 1412 and the second nanostructures may include nano-sheet channel structures (e.g., layers) 1402, 1406, and 1410. The alternating series of nanostructures may be formed as a stack over the substrate S, wherein the structures 1402-1412 are disposed on top of one another along a vertical direction (e.g., the Z direction). Thus, 1412 is disposed on top of S, 1410 is disposed on top of 1412, and so on, with 1402 being the structure disposed on top (in the most Z direction). Such a stack may sometimes be referred to as a superlattice.

The alternating series of nanostructures can be formed by epitaxially growing one layer and then the next until the desired number and desired thicknesses of the nanostructures are achieved. Epitaxial materials can be grown from gaseous or liquid precursors. Epitaxial materials can be grown using vapor-phase epitaxy (VPE), molecular-beam epitaxy (MBE), liquid-phase epitaxy (LPE), or other suitable process. Epitaxial silicon, silicon germanium, and/or carbon doped silicon (Si:C) silicon can be doped during deposition (in-situ doped) by adding dopants, n-type dopants (e.g., phosphorus or arsenic) or p-type dopants (e.g., boron or gallium), depending on the type of transistor.

Figure 14B:
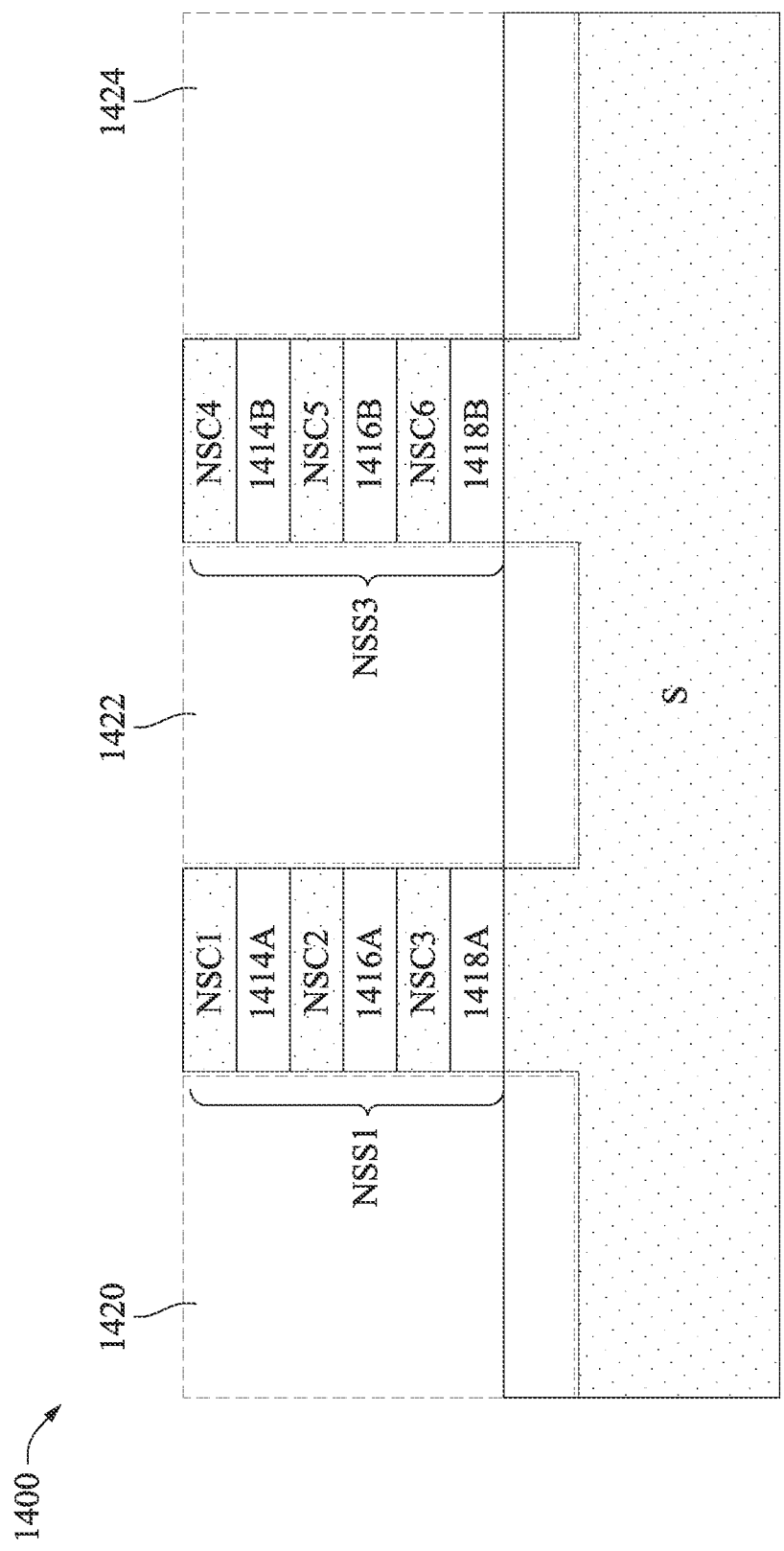

FIG. 14B is a y-y' cross sectional view of the IC structure 1400 after a first etching. A portion (e.g., an unmasked/exposed portion) of the alternating series of nanostructures in the IC structure 1400 can be removed by a directional etch (e.g., reactive ion etch (RIE)) to form one or more stacks of alternating series of nanostructures, such as NSS1 and NSS3 (as shown in FIG. 3). For example, after etching, the IC structure 1400 depicted in FIG. 14B includes a first stack of the alternating series of nanostructures NSS1 includes a stack (in Z direction) of etched dummy gate fill structure 1418A, etched nano-sheet channel structure NSC3, etched dummy gate fill structure 1416A, etched nano-sheet channel structure NSC2, etched dummy gate fill structure 1414A, and etched nano-sheet channel structure NSC1, and a second stack of the alternating series of nanostructures NSS3 includes a stack (in Z direction) of etched dummy gate fill structure 1418B, etched nano-sheet channel structure NSC6, etched dummy gate fill structure 1416B, etched nano-sheet channel structure NSC5, etched dummy gate fill structure 1414B, and etched nano-sheet channel structure NSC4. The directional etch may be a non-selective etch to remove unmasked portions through a single etching step, or alternating selective RIEs may be used to remove exposed portion(s) of each structure/layer separately. As a result of the etching, trenches 1420, 1422, and 1424 are formed around and in between NSS1 and NSS3. In some embodiments, there are greater than or less than two stacks of alternating series of nanostructures.

Figure 14C:
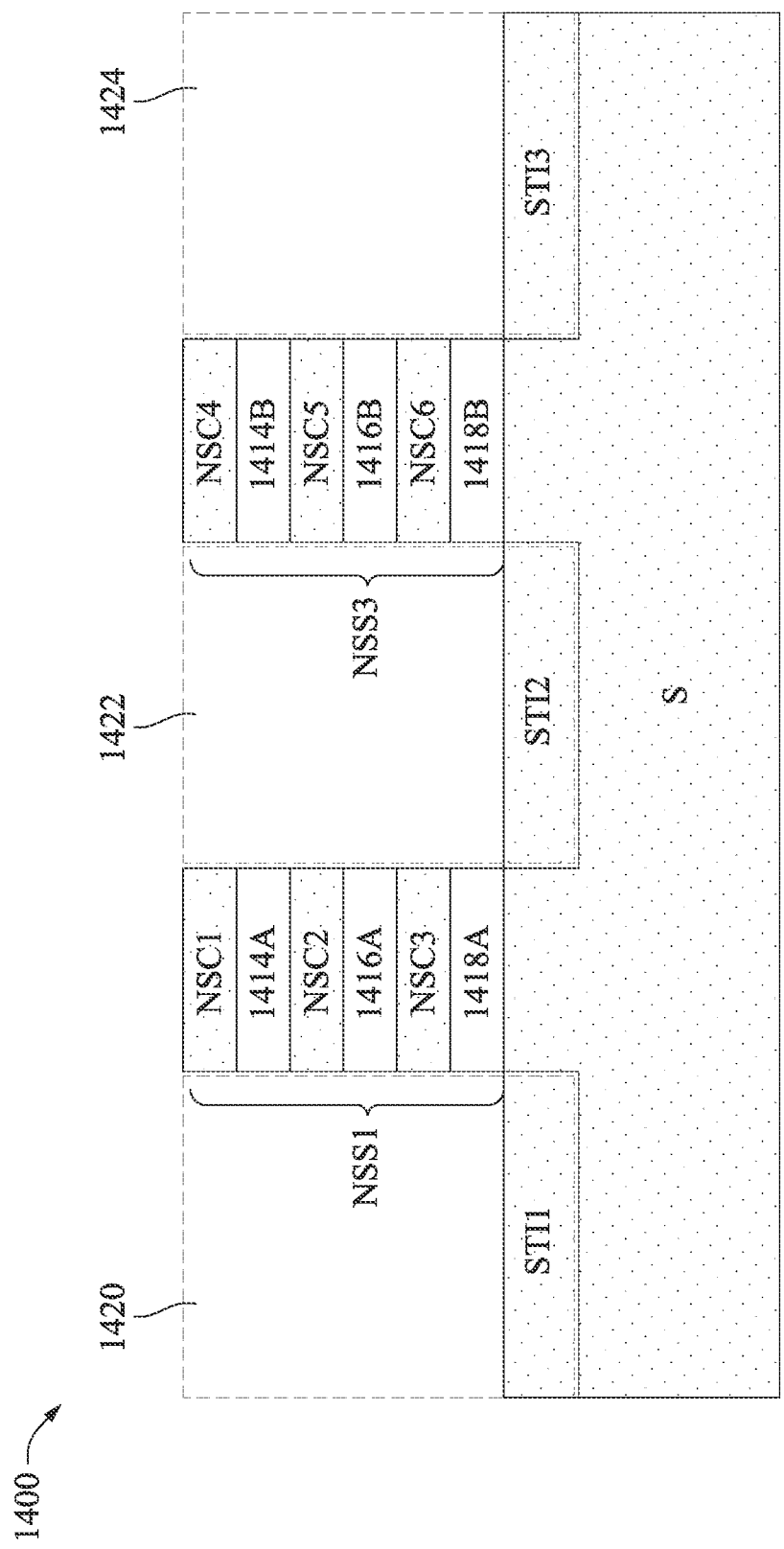

FIG. 14C is a y-y' cross sectional view of the IC structure 1400 after forming a shallow trench insulator (STI). A shallow trench insulators STI1-STI3 in the IC structure 1400 depicted in FIG. 14C is formed at the bottom of trenches 1420, 1422, and 1424. In some embodiments, forming STI1-STI3 includes depositing one or more dielectric materials (such as silicon dioxide) to fill the trenches 1420, 1422, and 1424, and removing the excess dielectric using a technique such as chemical-mechanical planarization (CMP).

Figure 14D:
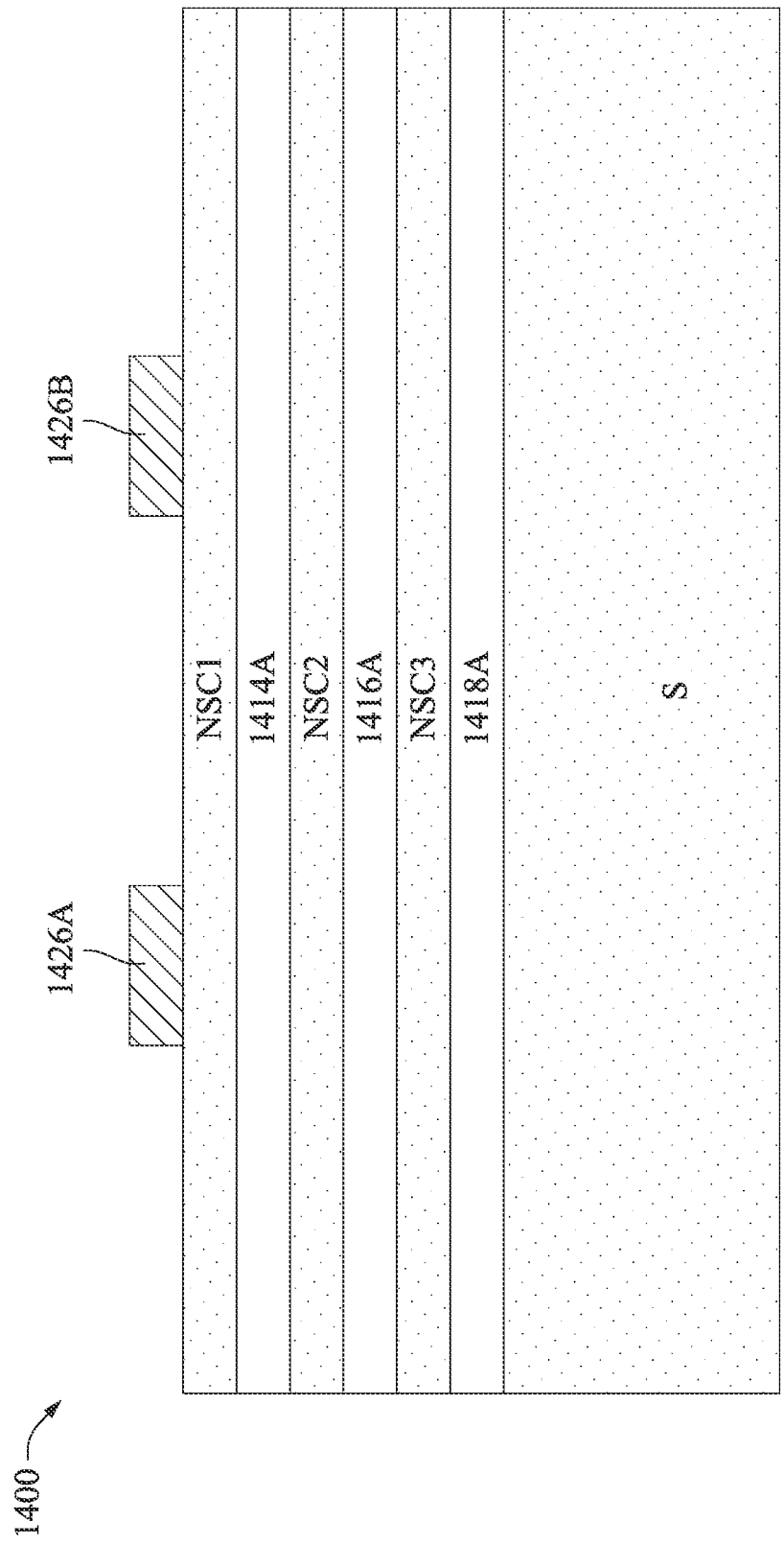

FIG. 14D is an x-x' cross sectional view of the IC structure 1400 after forming dummy gate fill structure. The IC structure 1400 depicted in FIG. 14D includes dummy gate fill structures 1426A and 1426B formed on and around NSS1. In some embodiments, the dummy gate fill structures 1426A and 1426B may correspond to regions where the gates of nanosheet structures/devices will be formed. Although each of the dummy gate fill structures 1426A and 1426B is shown as a two-dimensional structure in FIG. 14D, it is appreciated that the dummy gate fill structures 1426A and 1426B are each formed as a three-dimensional structure to straddle NSS1. For example, each of the dummy gate fill structures 1426A and 1426B may be formed over and around sidewalls of NSS1. Dummy gate fill structures 1426A and 1426B can be formed by depositing at least one of polysilicon (p-Si) or amorphous silicon (a-Si) over and around NSS1. The p-Si or a-Si is then planarized to a desired level. A hard mask (not shown) can be deposited over the planarized silicon and patterned to form hard masks. The hard masks can be formed from a nitride or an oxide layer. An etching process (e.g., a reactive-ion etching (RIE) process) is applied to the p-Si or a-Si to form the dummy gate fill structures 1426A and 1426B. It is appreciated that dummy gate fill structures similar 1426A and 1426B are each formed on and around other stacks such as NSS3. In some embodiments, there are greater than or less than two dummy gate fill structures for each of the stacks.

Figure 14E:
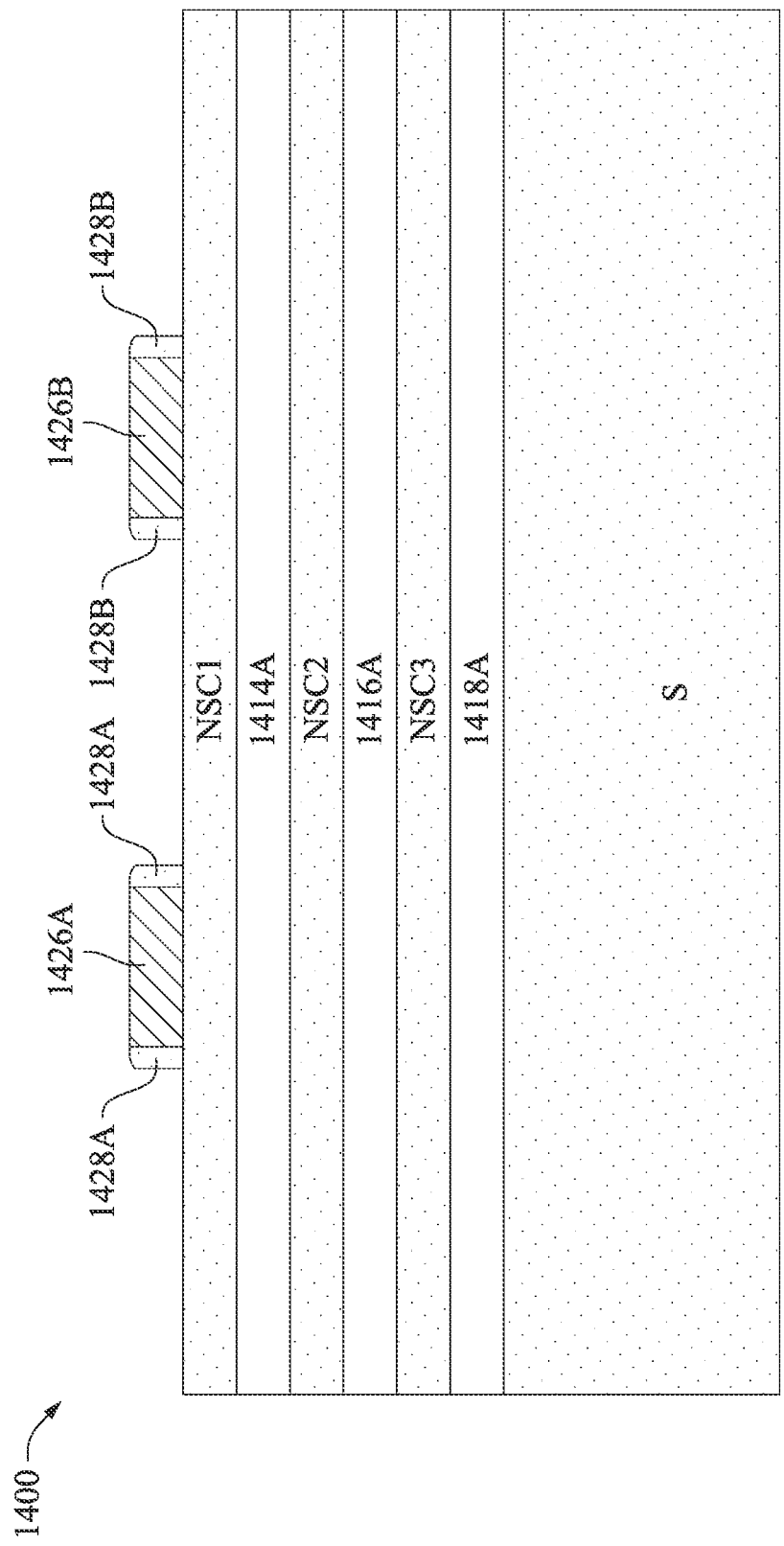

FIG. 14E is an x-x' cross sectional view of the IC structure 1400 after forming offset gate spacers. Offset gate spacers 1428A-B included in the IC structure 1400 depicted in FIG. 14E may be formed to extend along respective sidewalls of the dummy gate fill structures 1426A and 1426B. The offset gate spacers 1428A-B can be formed using a spacer pull down formation process. The offset gate spacers 1428A-B can also be formed by a conformal deposition of a dielectric material (e.g., silicon oxide, silicon nitride, silicon oxynitride, SiBCN, SiOCN, SiOC, or any suitable combination of those materials) followed by a directional etch (e.g., RIE). Such offset gate spacers 1428A-B may sometimes be referred to as outer spacers.

Figure 14F:
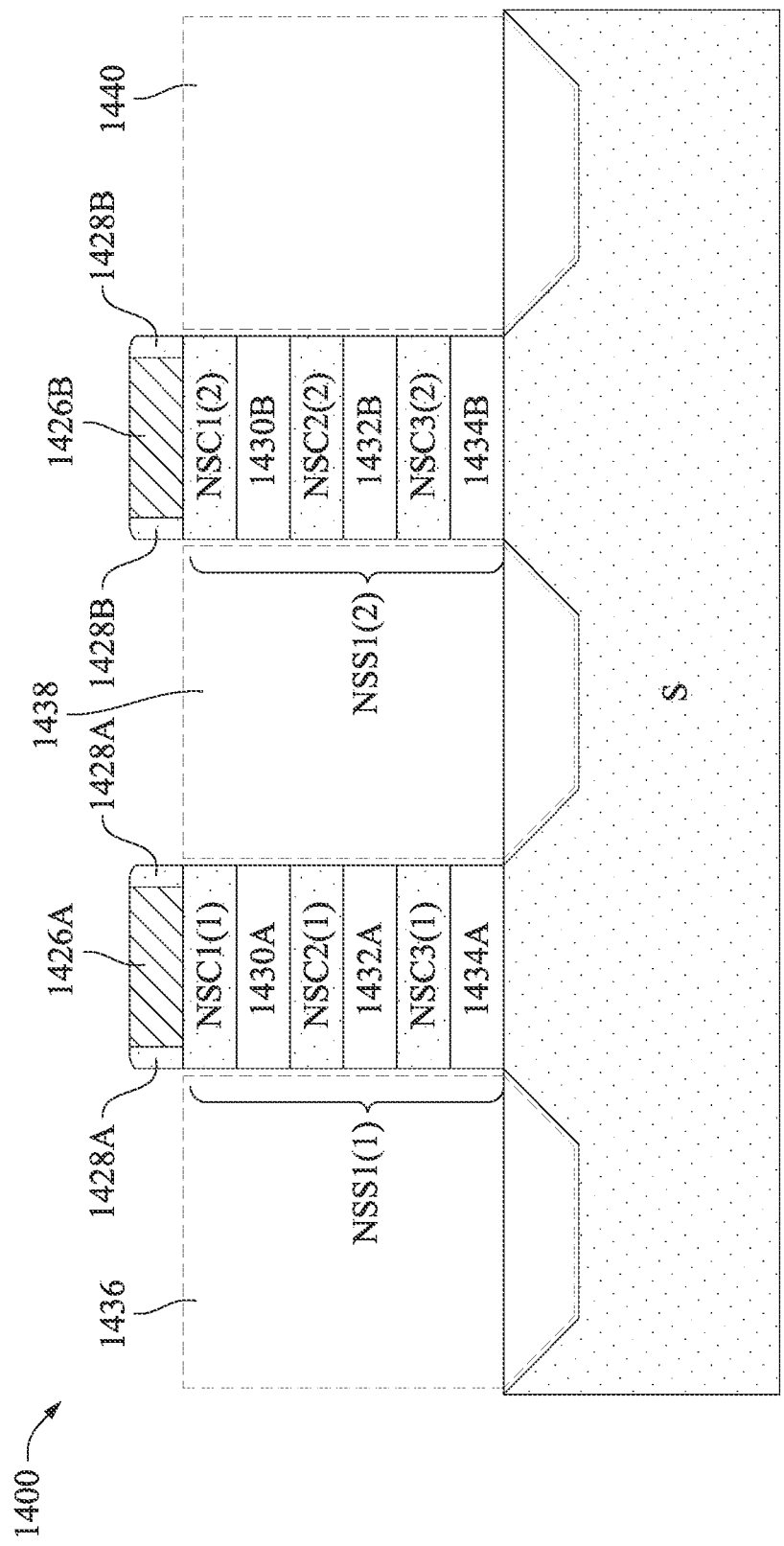

FIG. 14F is an x-x' cross sectional view of the IC structure 1400 after etching source and drain trenches. The IC structure 1400 depicted in FIG. 14F includes alternating-nanostructure columns NSS1(1) and NSS1(2) (as shown in FIG. 4). NSS1(1) and NSS1(2) may be formed by at least some of the following processes: using the offset gate spacers 1428A-B and the dummy gate fill structures 1426A and 1426B as a mask to define the footprint of NSS1(1) and NSS1(2), and etching NSS1 to form NSS1(1) and NSS1(2). As such, each of NSS1(1) and NSS1(2) includes a stack of alternating etched nanostructures. For example, NSS1(1) includes a stack (in Z direction) of etched dummy gate fill structure 1434A, etched nano-sheet channel structure NSC3(1), etched dummy gate fill structure 1432A, etched nano-sheet channel structure NSC2(1), etched dummy gate fill structure 1430A, and etched nano-sheet channel structure NSC1(1); and NSS1(2) includes a stack (in Z direction) of etched dummy gate fill structure 1434A, etched nano-sheet channel structure NSC3(1), etched dummy gate fill structure 1432A, etched nano-sheet channel structure NSC2(1), etched dummy gate fill structure 1430A, and etched nano-sheet channel structure NSC1(1). As a result of the S/D etching, S/D trenches 1436, 1438, and 1440 are formed around and in between NSS1(1) and NSS1(2). It is appreciated that columns similar to NSS1(1) and NSS1(2) are each formed on and around other stacks such as NSS3. In some embodiments, there are greater than or less than two columns of nanostructures for each of the stacks.

Figure 14G:
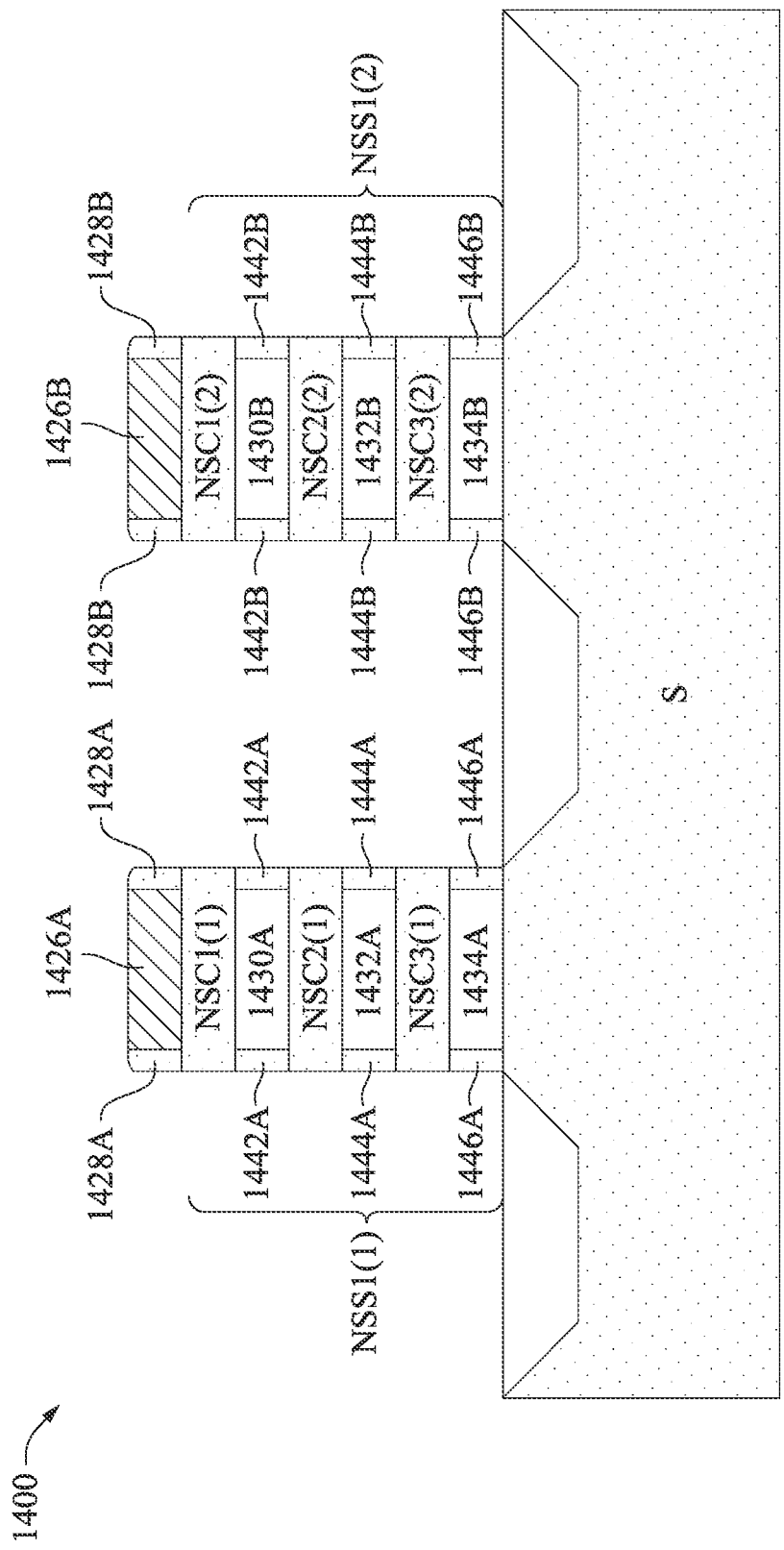

FIG. 14G is an x-x' cross sectional view of the IC structure 1400 after removing end portions of the dummy gate fill structures and forming inner spacers. The end portions of the etched dummy gate fill structures 1430A-B, 1432A-B, and 1434A-B can be removed using a first application, so called a "pull-back" process to pull the etched dummy gate fill structures 1430A-B, 1432A-B, and 1434A-B back an initial pull-back distance such that the ends of the dummy gate fill structures 1430A-B, 1432A-B, and 1434A-B respectively terminate underneath (e.g., aligned with) the offset gate spacers 1428A-B. The pull-back process may include a hydrogen chloride (HCL) gas isotropic etch process.

The IC structure 1400 depicted in FIG. 14G includes the inner spacers 1442A-B, 1444A-B, and 1446A-B. In some embodiments, the inner spacers 1442A-B, 1444A-B, and 1446A-B can be formed conformally by chemical vapor deposition (CVD), or by monolayer doping (MLD) of nitride followed by spacer RIE. In some other embodiments, the inner spacers 1442A-B, 1444A-B, and 1446A-B can be deposited using, e.g., a conformal deposition process and subsequent isotropic or anisotropic etch back to remove excess spacer material on vertical sidewalls of the alternating-nanostructure columns NSS1(1) and NSS1(2) and on a surface of the substrate S. A material of the inner spacers 1442A-B, 1444A-B, and 1446A-B can be formed from the same or different material as the offset gate spacer 1428A-B (e.g., silicon nitride). For example, the inner spacers 1442A-B, 1444A-B, and 1446A-B can be formed of silicon nitride, silicoboron carbonitride, silicon carbonitride, silicon carbon oxynitride, or any other type of dielectric material (e.g., a dielectric material having a dielectric constant k of less than about 5) appropriate to the role of forming an insulating gate sidewall spacers of FET devices.

Figure 14H:
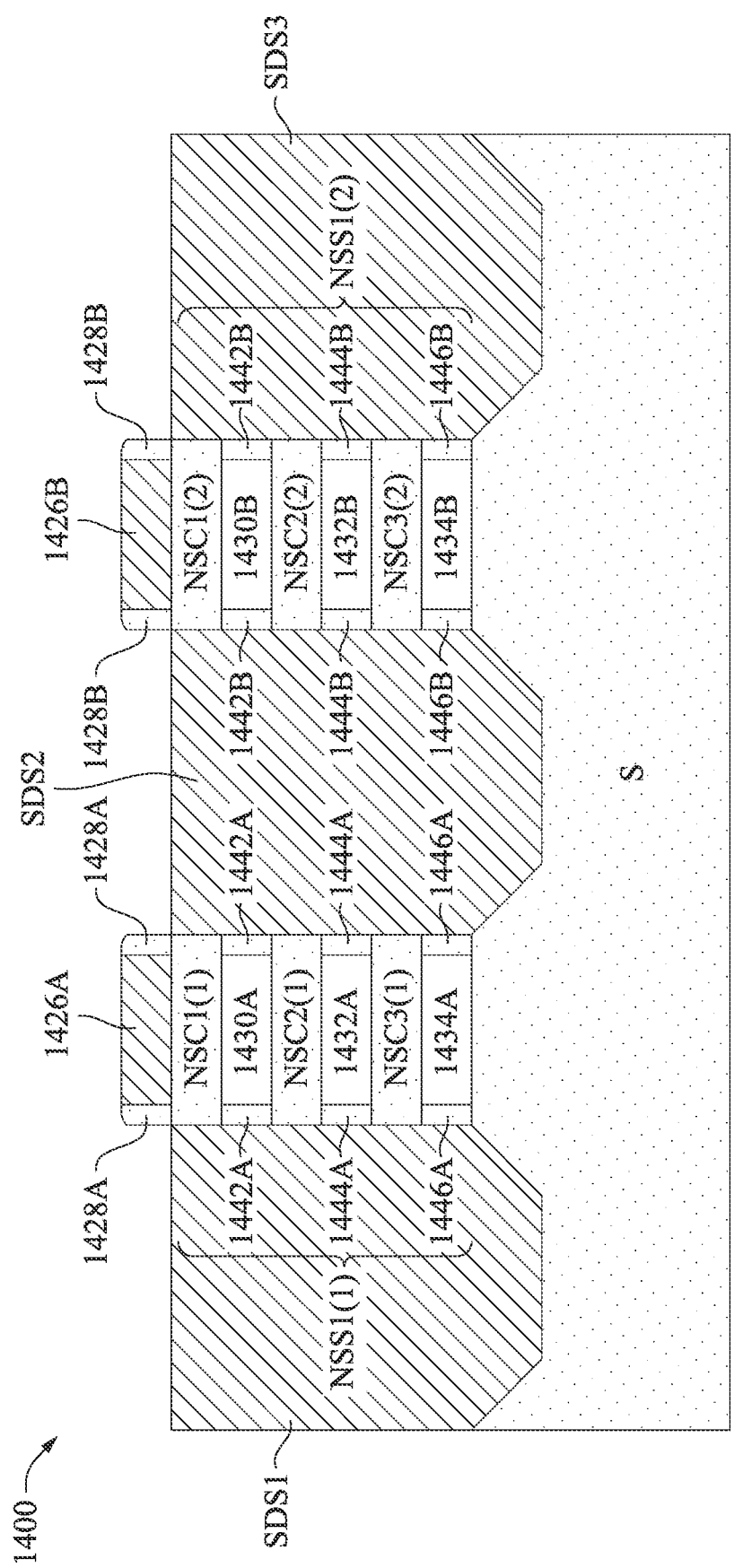

FIG. 14H is an x-x' cross sectional view of the IC structure 1400 after forming drain and source structures. The IC structure, as depicted in FIG. 14H, includes the drain/source structure SDS1, source/drain structure SDS2, and drain/source region SDS3 (as shown in FIG. 4). The drain/source structure SDS1 may be formed using an epitaxial layer growth process on the exposed ends of NSC1(1), NSC2(1), and NSC3(1) on the left-hand side of NSS1(1). The source/drain structure SDS2 may be formed using an epitaxial layer growth process on the exposed ends of NSC1(1), NSC2(1), and NSC3(1) on the right-hand side of NSS1(1) and/or the exposed ends of NSC1(2), NSC2(2), and NSC3(2) on the left-hand side of NSS1(2). If the source/drain structure SDS2 is formed from growth on both of NSS1(1) and NSS1(2), the two structures can be merged with each other to form a continuous structure. The drain/source region SDS3 may be formed using an epitaxial layer growth process on the exposed ends of NSC1(2), NSC2(2), and NSC3(2) on the right-hand side of NSS1(2).

In-situ doping (ISD) may be applied to form the doped drain/source structures SDS1-3, thereby creating the necessary junctions for nanosheet structures/devices. N-type and p-type FETs are formed by implanting different types of dopants to selected S/D regions of the device to form the necessary junction(s). N-type devices can be formed by implanting arsenic (As) or phosphorous (P), and p-type devices can be formed by implanting boron (B).

Figure 14I:
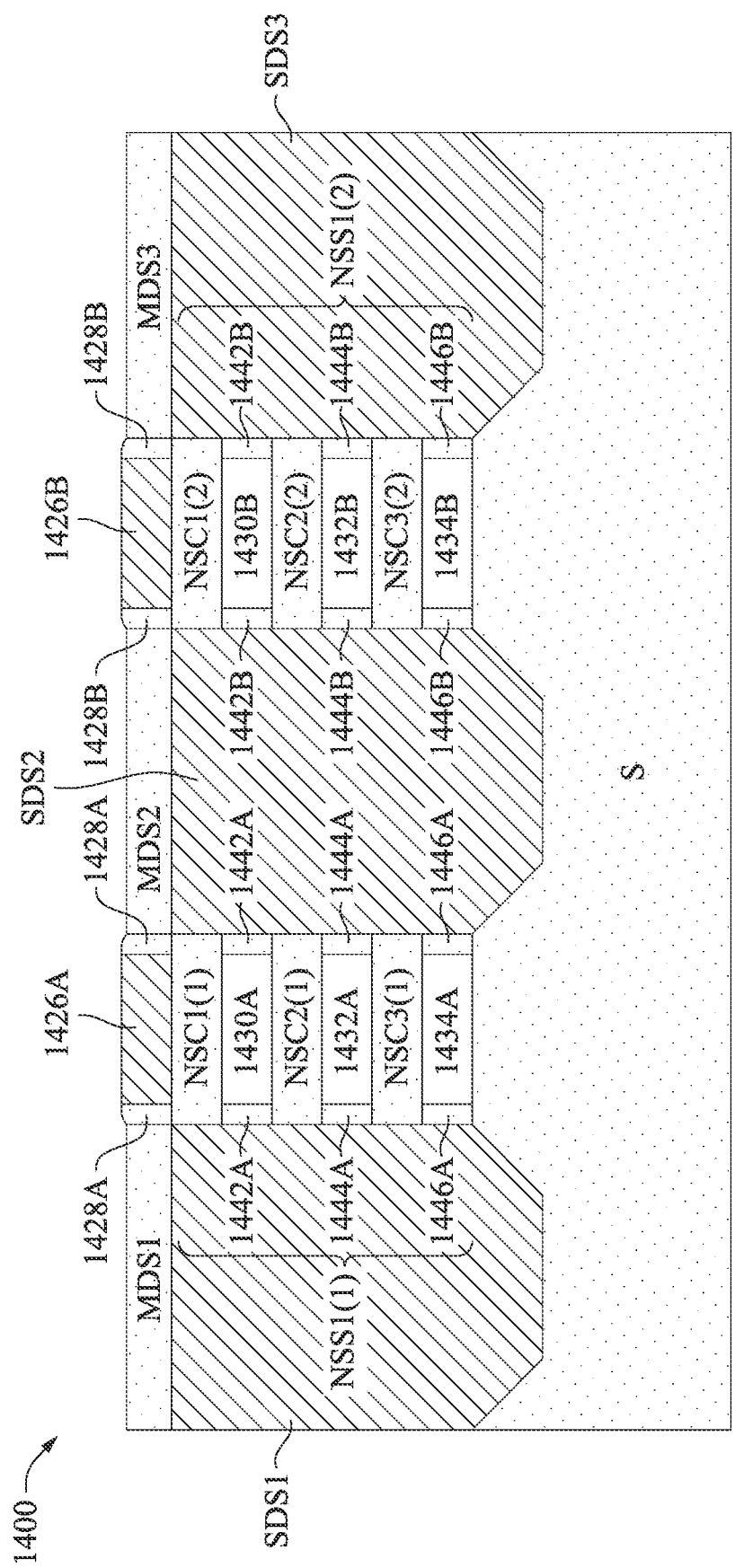

FIG. 14I is an x-x' cross sectional view of the IC structure 1400 after forming metal-like defined structures. The IC structure, as depicted in FIG. 14I, includes the metal-like defined structures MDS1, MDS2, and MDS3 (as shown in FIG. 4). MDS1, MDS2, and MDS3 may be formed on top of SDS1, SDS2, and SDS3, respectively, with a metal material (e.g., copper, tungsten). MDS1, MDS2, and MDS3 may be formed by performing at least some of the following processes: using any of a variety of deposition techniques (e.g., CVD, electroplating, e-beam, sputtering, etc.) to deposit the metal material over SDS1, SDS2, and SDS3; polishing out excessive metal material; and cleaning. In some embodiments, MDS1, MDS2, and MDS3 include an inter-layer dielectric level zero (ILD0) structure.

Figure 14J:
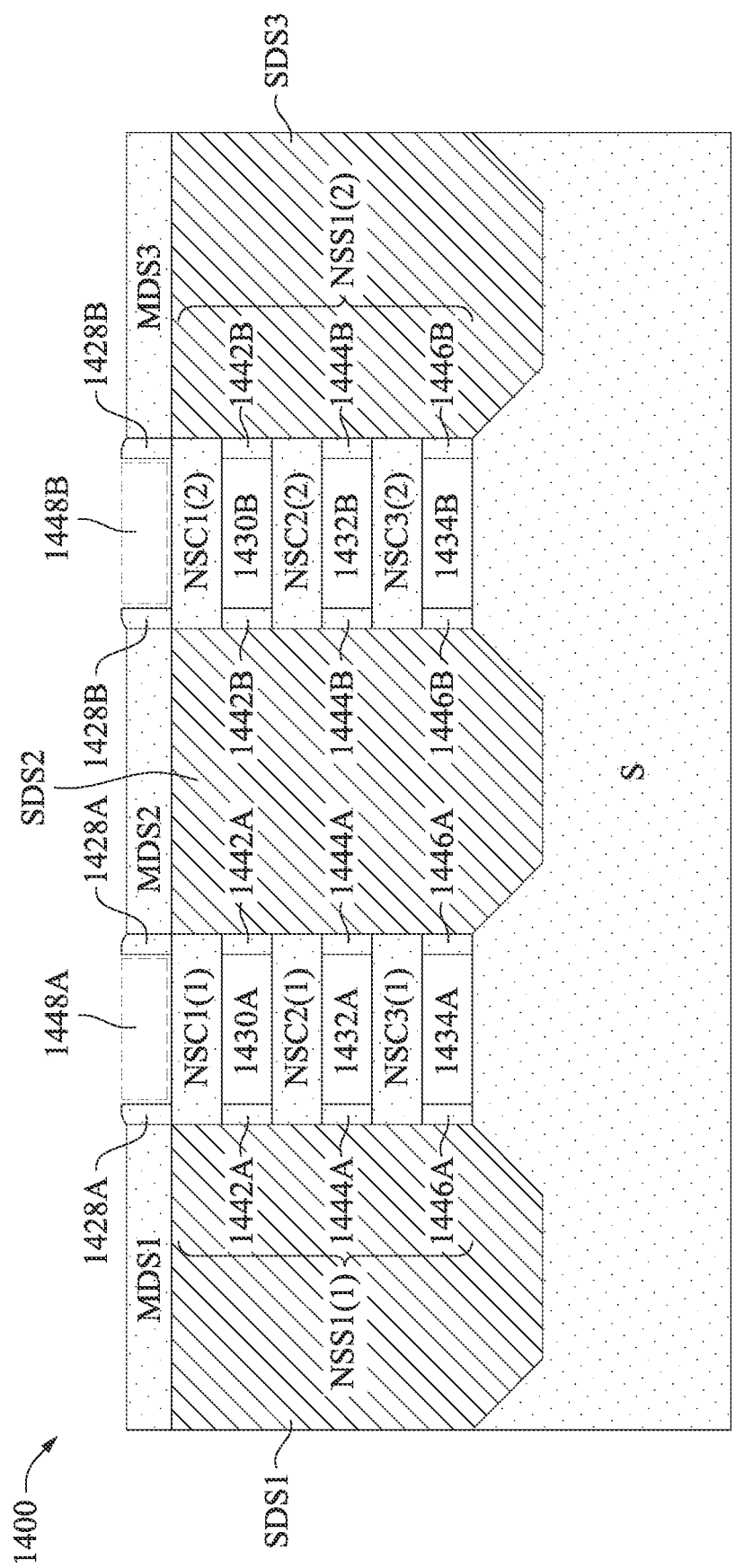

FIG. 14J is an x-x' cross sectional view of the IC structure 1400 after removing dummy gate fill structures. As depicted in FIG. 14J, the dummy gate fill structures 1426A-B are removed. The dummy gate fill structures 1426A-B can be removed by a known etching process, e.g., RIE or chemical oxide removal (COR). After the removal of the dummy gate fill structures 1426A-B, respective top boundaries of the NSS1(1) and NSS1(2) may be again exposed. As a result of the removal, recesses 1448A and 1448B are formed in between pairs of offset gate spacers 1428A and 1428B, respectively.

Figure 14K:
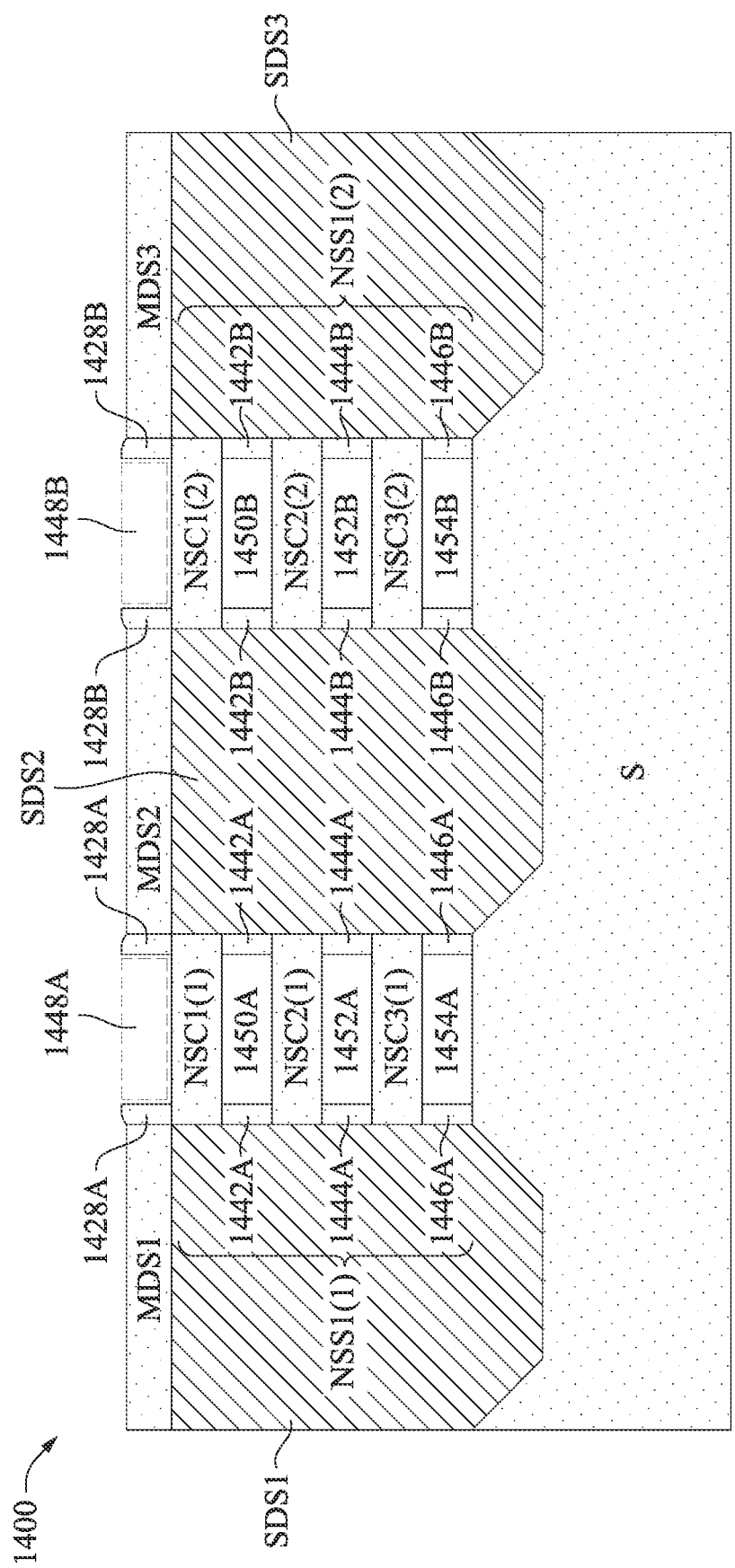

FIG. 14K is an x-x' cross sectional view of the IC structure 1400 after removing dummy gate fill structures. As depicted in FIG. 14K, the dummy gate fill structures 1414A-B, 1416A-B, and 1418A-B are removed. The dummy gate fill structures 1414A-B, 1416A-B, and 1418A-B can be removed by applying a selective etch (e.g., a hydrochloric acid (HCl)). After the removal of the dummy gate fill structures 1414A-B, 1416A-B, and 1418A-B, respective bottom boundaries of NSC1(1), NSC2(1), and NSC3(1) of NSS(1) and NSC1(2), NSC2(2), and NSC3(2) of NSS(2) may be exposed. As a result of the removal, recesses 1450A, 1452A, 1454A, 1450B, 1452B, and 1454B are formed in between pairs of inner spacers 1442A, 1444A, 1446A, 1442B, 1444B, and 1446B, respectively.

Figure 14L:
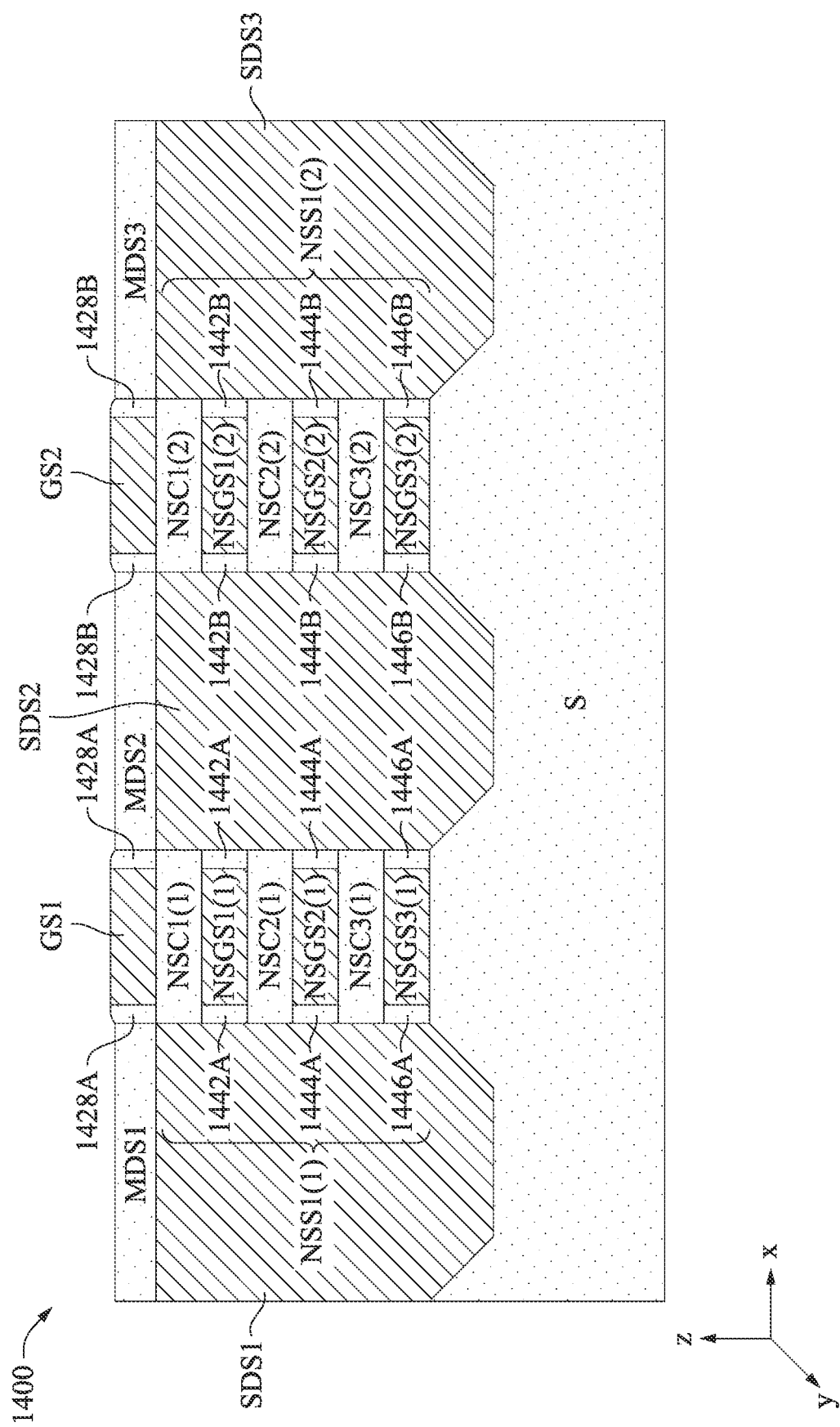

FIG. 14L is an x-x' cross sectional view of the IC structure 1400 after adding gate structures. The IC structure 1400 depicted in FIG. 14L includes GS1, NSGS1(1), NSGS2(1), NSGS3(1), GS2, NSGS1(2), NSGS2(2), and NSGS3(2) (as shown in FIG. 4). For example, NSS1(1) includes a stack (in Z direction) of gate structure NSGS3(1), etched nano-sheet channel structure NSC3(1), gate structure NSGS2(1), etched nano-sheet channel structure NSC2(1), etched gate structure NSGS1(1), etched nano-sheet channel structure NSC1(1), and gate structure GS1; and NSS1(2) includes a stack (in Z direction) of gate structure NSGS3(2), etched nano-sheet channel structure NSC3(2), gate structure NSGS2(2), etched nano-sheet channel structure NSC2(2), etched gate structure NSGS1(2), etched nano-sheet channel structure NSC1(2), and gate structure GS2.

The gate structures GS1, NSGS1(1), NSGS2(1), NSGS3(1), GS2, NSGS1(2), NSGS2(2), and NSGS3(2) include gate metals. The gate metals can be deposited using any suitable method, including, for example, CVD. In some embodiments, the gate structures include high-k dielectric materials. The gate dielectrics can be deposited using any suitable method, including, for example, atomic layer deposition (ALD). In some embodiments, the gate metals can wrap around each of the nano-sheet channel structures with the gate dielectric disposed therebetween.

One aspect of this description relates to a method for operating an integrated circuit (IC) manufacturing system. The method includes placing a first nano-sheet structure within a first active region of an IC layout diagram of a cell. The first nano-sheet structure extends in a first direction and has a first width in a second direction perpendicular to the first direction. The method includes abutting a second nano-sheet structure with the first nano-sheet structure along the second direction. The second nano-sheet structure extends in the first direction and has a second width in the second direction. The second nano-sheet structure is within a second active region. The second width is less than the first width. The method includes storing the IC layout diagram in a cell library. In some embodiments, the placing the first nano-sheet structure includes positioning the first nano-sheet structure a first distance from a first cell border segment along the second direction. In some embodiments, the abutting the second nano-sheet structure includes positioning the second nano-sheet structure the first distance along the second direction from the first cell border segment. In some embodiments, the first distance corresponds to a first minimum spacing rule. In some embodiments, the method further includes placing a third nano-sheet structure within a third active region of the IC layout diagram. In some embodiments, the third nano-sheet structure extends in the first direction and has a third width in the second direction. In some embodiments, the third nano-sheet structure is separated from the first nano-sheet structure by a second distance along the second direction. In some embodiments, the method further includes abutting a fourth nano-sheet structure with the third nano-sheet structure along the second direction. In some embodiments, the fourth nano-sheet structure extends in the first direction and has a fourth width in the second direction. In some embodiments, the fourth nano-sheet structure is within a fourth active region. In some embodiments, the fourth nano-sheet structure is separated from the second nano-sheet structure by a third distance along the second direction. In some embodiments, the fourth width is less than the third width. In some embodiments, the third distance is greater than the second distance. In some embodiments, the third width is equal to the first width and the fourth width is equal to the second width. In some embodiments, the first active region that has a third width, the second active region that has a fourth width, and the fourth width is less than the third width. In some embodiments, the first nano-sheet structure comprises alternating layers of nano-sheet channel and gate region. In some embodiments, the first active region is one of an n-type active region or a p-type active region, and the second active region is the other of the n-type active region or the p-type active region.

Another aspect of this description relates to an integrated circuit (IC) layout generation system including a processor and a non-transitory, computer readable storage medium including computer program code for one or more programs. The non-transitory, computer readable storage medium and the computer program code are configured to, with the processor, cause the system to arrange a first cell as a first nano-sheet structure and a second nano-sheet structure. The first nano-sheet structure extends in a first direction and has a first width in a second direction perpendicular to the first direction. The second nano-sheet structure extends in the first direction and has a second width in the second direction. The second nano-sheet structure is separated from the first nano-sheet structure by a first distance along the second direction. The non-transitory, computer readable storage medium and the computer program code are configured to, with the processor, cause the system to arrange a second cell as a third nano-sheet structure and a fourth nano-sheet structure. The third nano-sheet structure extends in the first direction and has a third width in the second direction. The fourth nano-sheet structure extends in the first direction and has a fourth width in the second direction. The fourth nano-sheet structure is separated from the third nano-sheet structure by a second distance along the second direction. The third width is less than the first width and the fourth width is less than the second width. The non-transitory, computer readable storage medium and the computer program code are configured to, with the processor, cause the system to align the second cell with the first cell such that the third nano-sheet structure abuts with the first nano-sheet structure along the second direction and the fourth nano-sheet structure abuts with the second nano-sheet structure along the second direction. The non-transitory, computer readable storage medium and the computer program code are configured to, with the processor, cause the system to generate an IC layout diagram based on the first cell and the second cell. In some embodiments, the non-transitory, computer readable storage medium and the computer program code are configured to, with the processor, further cause the system to place the first nano-sheet structure within a first active region included in the first cell and place the second nano-sheet structure within a second active region. In some embodiments, the first active region that has a fifth width, the second active region that has a sixth width, and the sixth width is less than the fifth width. In some embodiments, the first cell comprises a second active region. In some embodiments, the first active region is one of an n-type active region or a p-type active region and the second active region is the other of the n-type active region or the p-type active region. In some embodiments, the second distance is greater than the first distance. In some embodiments, the third width is equal to the first width and the fourth width is equal to the second width. In some embodiments, the first nano-sheet structure comprises alternating layers of nano-sheet channel and gate region. In some embodiments, the non-transitory, computer readable storage medium and the computer program code are configured to, with the processor, further cause the system to position the first nano-sheet structure a third distance from a first cell border segment along the second direction and position the third nano-sheet structure the third distance along the first direction from the first cell border segment. In some embodiments, the third distance corresponds to a first minimum spacing rule.

Another aspect of this description relates to an integrated circuit (IC) structure including a first nano-sheet structure corresponding to a first type of an n-type or a p-type. The first nano-sheet structure extends in a first direction and has a first width in a second direction perpendicular to the first direction. The IC structure includes a second nano-sheet structure corresponding to a second type of the n-type or the p-type. The second nano-sheet structure extends in the first direction and has a second width in the second direction. The second nano-sheet structure is separated from the first nano-sheet structure by a first distance along the second direction. The second width is less than the first width. In some embodiments, the IC structure further includes a third nano-sheet structure corresponding to the first type. In some embodiments, the third nano-sheet structure extends in the first direction and has a third width in the second direction. In some embodiments, the third nano-sheet structure abuts the first nano-sheet structure along the second direction. In some embodiments, the third width is less than the first width. In some embodiments, the IC structure further includes a fourth nano-sheet structure corresponding to the second type. In some embodiments, the fourth nano-sheet structure extends in the first direction and has a fourth width in the second direction. In some embodiments, the fourth nano-sheet structure abuts the second nano-sheet structure along the second direction. In some embodiments, the fourth width is less than the second width.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) structure comprising:
a first cell comprising a first portion with a first cell height that extends in a first direction a second portion with a second cell height, wherein the first cell has a first cell width that extends in a second direction perpendicular to the first direction; and
a second cell abutted against the first cell, wherein the second cell has the first cell height or the second cell height, wherein the second cell height is less than the first cell height, wherein the second cell has a second cell width that extends in the second direction, wherein the second cell width is less than the first cell width.

2. The IC structure of claim 1, wherein a combined cell height of the first cell and the second cell is constant along the second direction, and a combined cell width of the first cell and the second cell is constant along the first direction.

3. The IC structure of claim 1, further comprising:
an active region extending in the second direction, the active region disposed across the first cell and the second cell.

4. The IC structure of claim 3, wherein the active region comprises a first portion with a first width and a second portion with a second width extending in the first direction, wherein the first width is different from the second width, and wherein the first portion and the second portion of the active region correspond to the first cell.

5. The IC structure of claim 4, wherein the active region comprises a third portion with the second width extending in the first direction, and wherein the third portion corresponds to the second cell.

6. The IC structure of claim 4, further comprising a gate region extending in the first direction, wherein the gate region intersects the active region.

7. The IC structure of claim 6, wherein the active region comprises:
a stack of nano-sheet structures.

8. An integrated circuit (IC) structure comprising:
a first cell comprising a first portion with a first cell height that extends in a first direction, a second portion with a second cell height extends in the first direction, and a third portion with a third cell height that extends in the first direction and is equal to a sum of the first and second cell heights, wherein the first cell has a first cell width that extends in a second direction perpendicular to the first direction; and
a second cell abutted against the first cell, wherein the second cell has the first cell height or the second cell height, wherein the second cell height is different from the first cell height, wherein the second cell has a second cell width that extends in the second direction, wherein the second cell width is different from the first cell width.

9. The IC structure of claim 8, wherein the second cell height is less than the first cell height, and the second cell width is less than the first cell width.

10. The IC structure of claim 8, wherein the sum is constant along the second direction and a combined cell width of the first cell and the second cell is constant along the first direction.

11. The IC structure of claim 8, further comprising:
an active region extending in the second direction, the active region disposed across the first cell and the second cell.

12. The IC structure of claim 11, wherein the active region comprises a first portion with a first width and a second portion with a second width extending in the first direction, wherein the first width is different from the second width, and wherein the first portion and the second portion of the active region correspond to the first cell.

13. The IC structure of claim 12, wherein the active region comprises a third portion with the second width extending in the first direction, and wherein the third portion corresponds to the second cell.

14. The IC structure of claim 13, further comprising a gate region extending in the first direction, wherein the gate region intersects the active region.

15. The IC structure of claim 8, wherein the second cell is abutted against the first cell in the first direction.

16. The IC structure of claim 8, wherein the second cell is abutted against the first cell in the second direction.

17. An integrated circuit (IC) structure comprising:
a first cell comprising a first portion with a first cell height that extends in a first direction, a second portion with a second cell height extends in the first direction, and a third portion with a third cell height that extends in the first direction and is equal to a sum of the first and second cell heights, wherein the first cell has a first cell width that extends in a second direction perpendicular to the first direction; and
a second cell abutted against the first cell, wherein the second cell has the first cell height or the second cell height, wherein the second cell height is less than the first cell height, wherein the second cell has a second cell width that extends in the second direction, wherein the second cell width is less than the first cell width.

18. The IC structure of claim 17, wherein the second cell is abutted against the first cell in the first direction.

19. The IC structure of claim 17, wherein the second cell is abutted against the first cell in the second direction.

* * * * *